(12) United States Patent
Weiss et al.

(10) Patent No.: US 11,321,824 B2
(45) Date of Patent: May 3, 2022

(54) MODULAR OPTICAL INSPECTION STATION

(71) Applicant: Instrumental, Inc., Los Altos, CA (US)

(72) Inventors: Samuel Bruce Weiss, Palo Alto, CA (US); Anna-Katrina Shedletsky, Palo Alto, CA (US)

(73) Assignee: Instrumental, Inc., Los Altos, CA (US)

( * ) Notice: Subject to any disclaimer, the term of this patent is extended or adjusted under 35 U.S.C. 154(b) by 0 days.

(21) Appl. No.: 16/984,062

(22) Filed: Aug. 3, 2020

(65) Prior Publication Data

US 2020/0364851 A1    Nov. 19, 2020

Related U.S. Application Data

(63) Continuation of application No. 15/653,040, filed on Jul. 18, 2017, now Pat. No. 10,783,624.

(Continued)

(51) Int. Cl.
| | |
|---|---|
| *G06T 7/00* | (2017.01) |
| *H04N 9/82* | (2006.01) |
| *G01B 11/02* | (2006.01) |
| *G01N 21/88* | (2006.01) |
| *H04N 5/225* | (2006.01) |

(Continued)

(52) U.S. Cl.
CPC .......... *G06T 7/0004* (2013.01); *G01B 11/022* (2013.01); *G01N 21/8806* (2013.01); *G01N 21/8851* (2013.01); *H04N 5/2256* (2013.01); *H04N 5/247* (2013.01); *H04N 5/76* (2013.01); *H04N 9/8205* (2013.01); *G01N 21/93* (2013.01); *G01N 2021/8825* (2013.01); *G01N 2021/95638* (2013.01); *H05B 47/16* (2020.01)

(58) Field of Classification Search
CPC ...... H04N 9/8205; H04N 5/2256; H04N 5/76; H04N 5/247; G01B 11/022; G06T 7/0004; G01N 2021/95638; G01N 2021/8825
See application file for complete search history.

(56) References Cited

U.S. PATENT DOCUMENTS

| | | | | |
|---|---|---|---|---|
| 4,595,265 A | * | 6/1986 | Hodgson | G02B 6/3803 |
| | | | | 359/383 |
| 4,955,698 A | * | 9/1990 | Knoll | G02F 1/134336 |
| | | | | 349/145 |

(Continued)

*Primary Examiner* — Jefferey F Harold
*Assistant Examiner* — Timothy R Newlin
(74) *Attorney, Agent, or Firm* — Run8 Patent Group, LLC; Peter Miller; Alexander Rodriguez

(57) ABSTRACT

One variation of an optical inspection kit includes: an enclosure defining an imaging volume; an optical sensor adjacent the imaging volume and defining a field of view directed toward the imaging volume; a nest module defining a receptacle configured to locate a surface of interest on a first unit of a first part within the imaging volume at an image plane of the optical sensor; a dark-field lighting module adjacent and perpendicular to the nest module and including a dark-field light source configured to output light across a light plane and a directional light filter configured to pass light output by the dark-field light source normal to the light plane and to reject light output by the dark-field light source substantially nonparallel to the light plane; and a bright-field light source proximal the optical sensor and configured to output light toward the surface of interest.

20 Claims, 8 Drawing Sheets

Related U.S. Application Data

(60) Provisional application No. 62/363,555, filed on Jul. 18, 2016, provisional application No. 62/378,359, filed on Aug. 23, 2016.

(51) Int. Cl.
*H04N 5/247* (2006.01)
*H04N 5/76* (2006.01)
*G01N 21/93* (2006.01)
*G01N 21/956* (2006.01)
*H05B 47/16* (2020.01)

(56) References Cited

U.S. PATENT DOCUMENTS

| | | | | |
|---|---|---|---|---|
| 6,064,517 A * | 5/2000 | Chuang | | G02B 13/12 |
| | | | | 359/351 |
| 6,179,439 B1 * | 1/2001 | Choate | | G01N 21/8806 |
| | | | | 359/387 |
| 6,323,995 B1 * | 11/2001 | Takahama | | G02B 7/003 |
| | | | | 359/371 |
| 6,628,380 B1 * | 9/2003 | Fujimori | | G01N 21/8806 |
| | | | | 356/237.1 |
| 6,876,761 B1 * | 4/2005 | Okuda | | H05K 13/0812 |
| | | | | 382/151 |
| 7,551,274 B1 * | 6/2009 | Wornson | | G01N 21/896 |
| | | | | 356/239.1 |
| 8,864,034 B1 * | 10/2014 | Lei | | G06K 7/10742 |
| | | | | 235/462.06 |
| 2002/0182716 A1 * | 12/2002 | Weisbuch | | G01N 21/6454 |
| | | | | 435/287.2 |
| 2004/0252372 A1 * | 12/2004 | Karasawa | | G02B 21/10 |
| | | | | 359/387 |
| 2005/0036057 A1 * | 2/2005 | Ushirokawa | | H04N 5/2254 |
| | | | | 348/340 |
| 2007/0057184 A1 * | 3/2007 | Uto | | H01J 37/226 |
| | | | | 250/310 |
| 2007/0146702 A1 * | 6/2007 | Canning, Jr. | | G01N 1/2813 |
| | | | | 356/336 |
| 2007/0289385 A1 * | 12/2007 | Kiuchi | | G01M 13/045 |
| | | | | 73/627 |
| 2012/0157160 A1 * | 6/2012 | Ozcan | | H04N 5/2254 |
| | | | | 455/556.1 |
| 2012/0275661 A1 * | 11/2012 | Hofman | | H04N 13/204 |
| | | | | 382/110 |
| 2013/0044202 A1 * | 2/2013 | Kajiro | | G02B 21/125 |
| | | | | 348/79 |
| 2013/0216120 A1 * | 8/2013 | Inoue | | G06T 7/0004 |
| | | | | 382/144 |
| 2013/0271595 A1 * | 10/2013 | Hiroi | | G06T 7/0004 |
| | | | | 348/80 |
| 2013/0277553 A1 * | 10/2013 | Otani | | H01J 37/261 |
| | | | | 250/307 |
| 2017/0082425 A1 * | 3/2017 | Minekawa | | G01B 11/30 |

* cited by examiner

MODULAR OPTICAL INSPECTION STATION

CROSS-REFERENCE TO RELATED APPLICATIONS

This application is a continuation application of U.S. patent application Ser. No. 15/653,040, filed on 18 Jul. 2017, which claims the benefit of U.S. Provisional Application No. 62/363,555, filed on 18 Jul. 2016, and U.S. Provisional Application No. 62/378,359, filed on 23 Aug. 2016, each of which are incorporated in their entireties by this reference.

This application is related to U.S. patent application Ser. No. 15/407,158, filed on 16 Jan. 2017, which is incorporated in its entirety by this reference.

TECHNICAL FIELD

This invention relates generally to the field of optical inspection and more specifically to a new and useful modular optical inspection station in the field of optical inspection.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
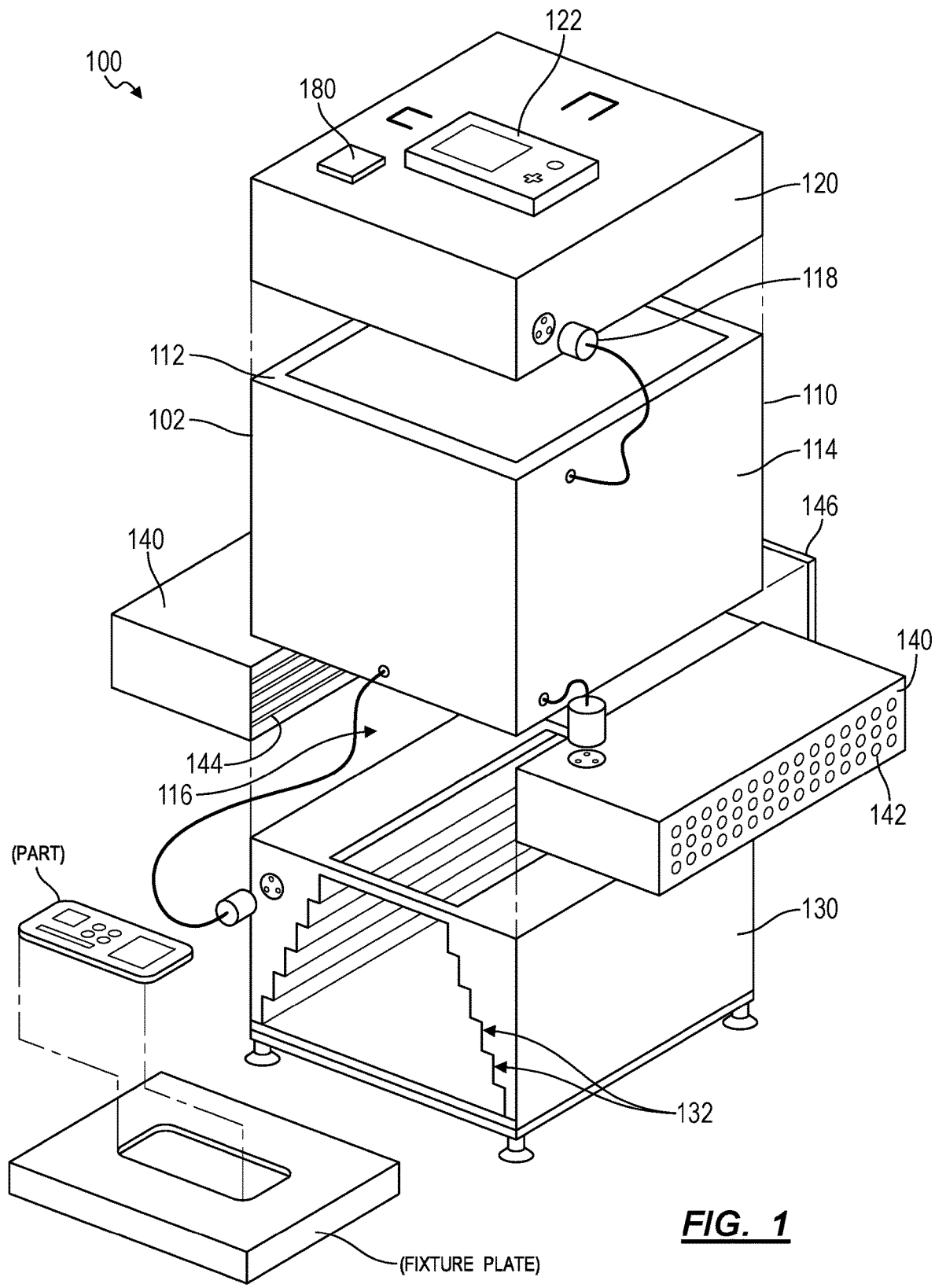
FIG. 1 is a schematic representation of a system.
Figure 7:
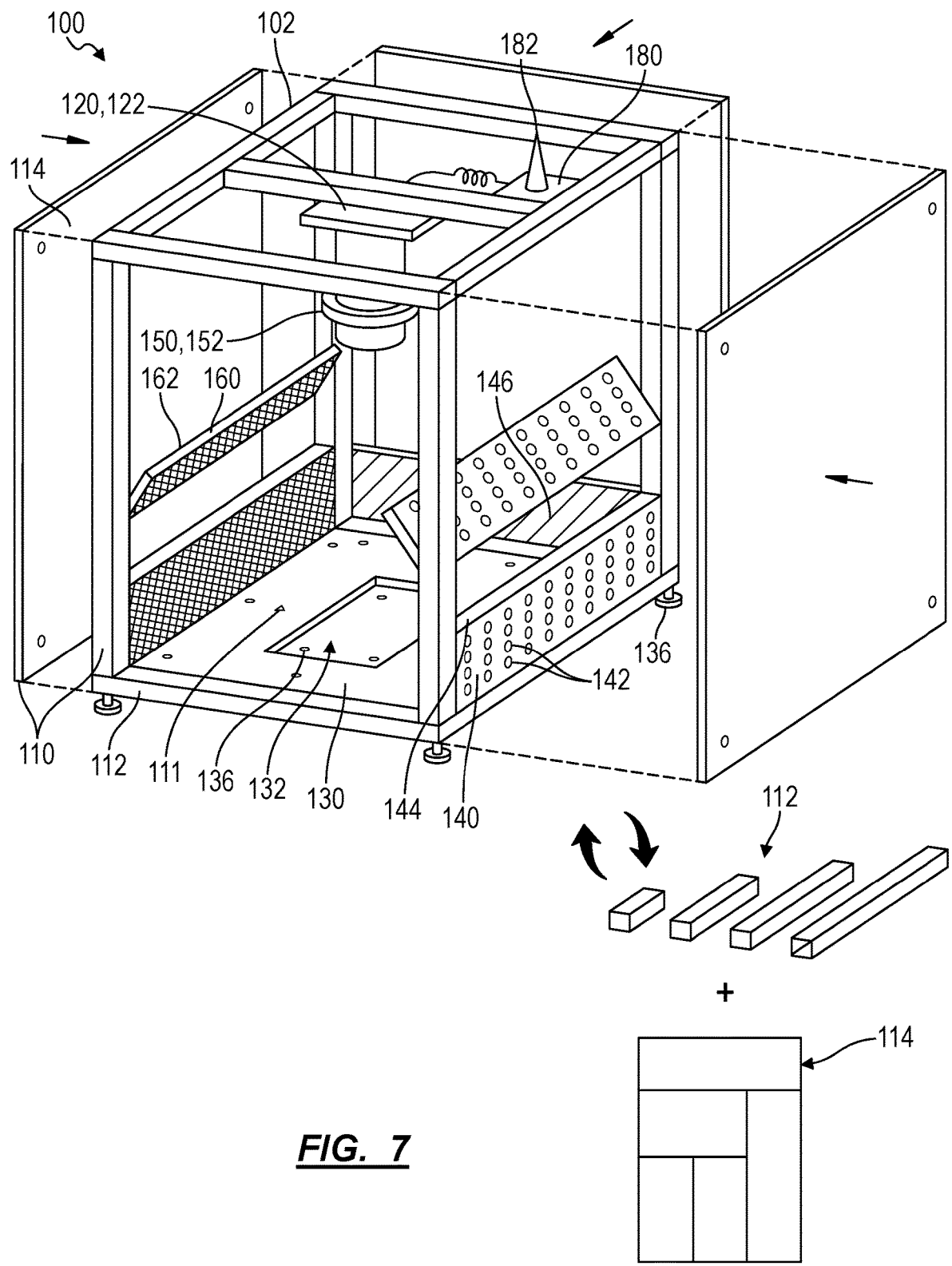
FIG. 7 is a schematic representation of one variation of the system.

As shown in FIGS. 1 and 7, a system 100 (or "kit") for recording images of parts for optical inspection includes: an enclosure 110 defining an imaging volume 111 and a window 116 adjacent the imaging volume 111; a sensor module 120 transiently coupled to the enclosure 110 and including an optical sensor 122 defining a field of view directed toward the imaging volume 111; a nest module 130 transiently coupled to the enclosure 110 adjacent the imaging volume 111 opposite the sensor module 120 and including a receptacle 132 configured to locate a surface of interest on a first unit of a first part at an image plane of the optical sensor 122; and a dark-field lighting module 140; a bright-field lighting module 150. The dark-field lighting module 140: includes a dark-field light source 142 configured to output light across a light plane; includes a directional light filter 144 extending across the dark-field light source 142, configured to pass light output by the dark-field light source 142 substantially normal to the light plane, and configured to reject light output by the dark-field light source 142 substantially non-parallel to the light plane; and transiently coupled to the enclosure 110 proximal the nest module 130 with a normal axis of the light plane substantially perpendicular to the surface of interest on the first unit of the first part. The bright-field lighting module 150 is transiently coupled to the enclosure 110 proximal the optical sensor 122 and including a bright-field light source 152 configured to output light toward the surface of interest. The system 100 can also include a controller 180 configured to: at a first time, activate the dark-field light source 142 and trigger the optical sensor 122 to record a first image of the first unit of the first part; and, at a second time different from the first time, activate the bright-field light source 152 and trigger the optical sensor 122 to record a second image of the first unit of the first part.

Figure 2:
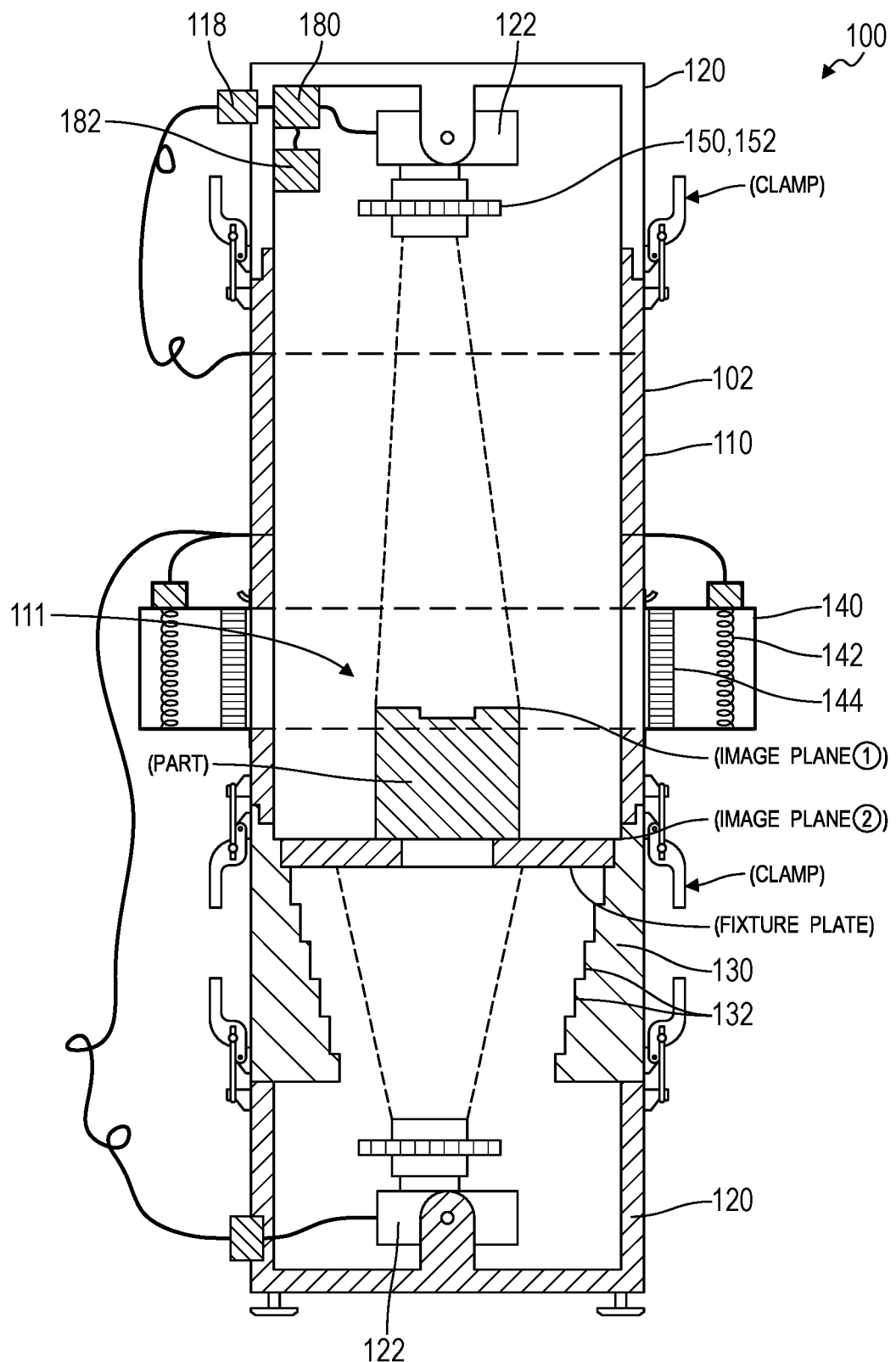
FIG. 2 is a schematic representation of one variation of the system.
Figure 3:
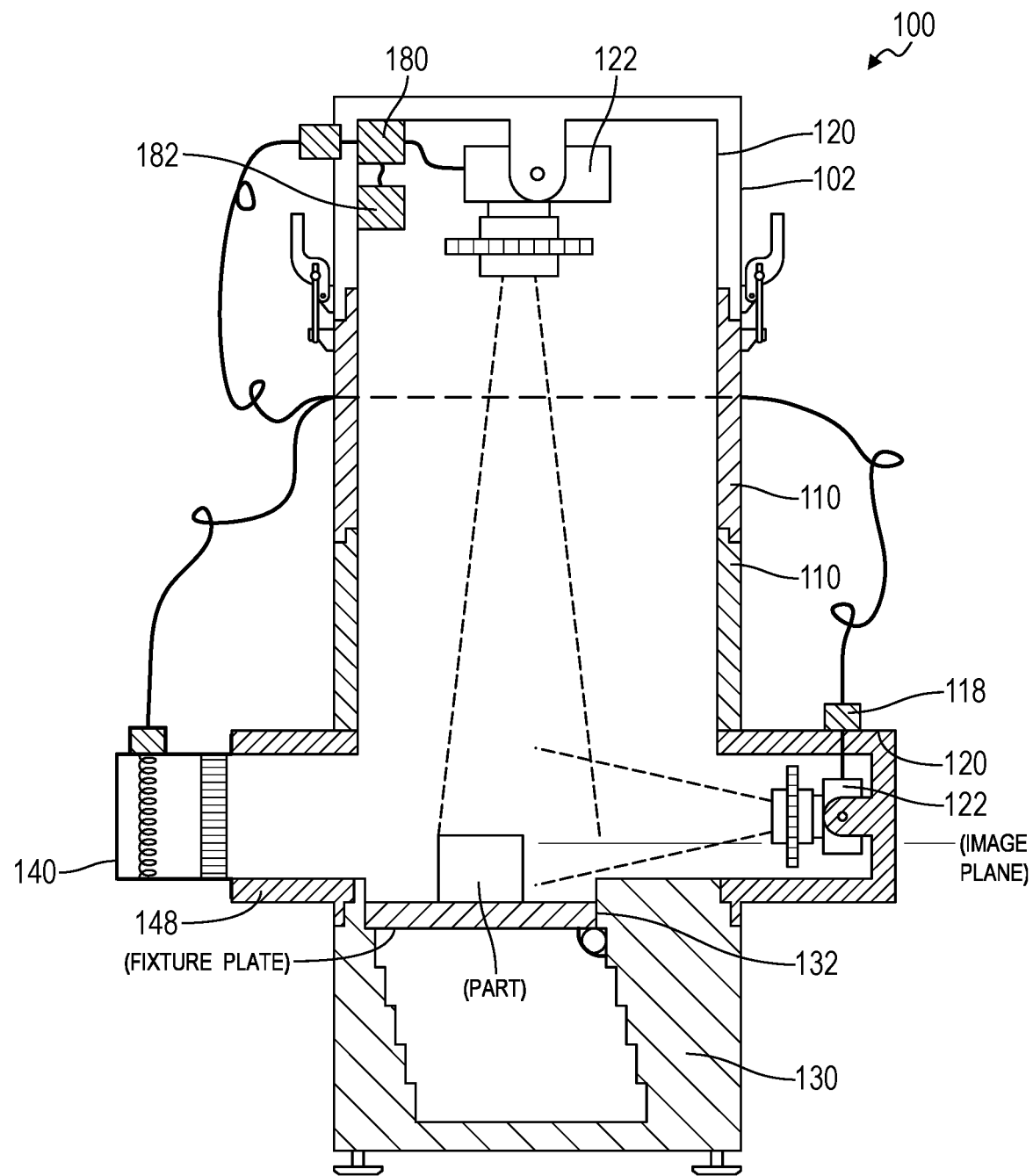
FIG. 3 is a schematic representation of one variation of the system.

As shown in FIGS. 1, 2, and 3, one variation of the system 100 includes: a sensor module 120; a nest module 130; a set of enclosures 110; a lighting module; and a controller 180. The sensor module 120 includes a camera defining a field of view. The nest module 130 includes a stepped receptacle 132 configured to locate a surface of a first part of a first height at an image plane and to locate a surface of a second part of a second height greater than the first height at the image plane. The set of enclosures 110 includes enclosures 110 of various heights, wherein a subset of these enclosures 110 can be assembled to transiently couple the sensor module 120 to the nest module 130 with the image plane at a target distance from the camera and to define an imaging volume 111 between the sensor module 120 and the nest module 130. The lighting module is configured to transiently couple to a side of the enclosure 110 proximal and perpendicular to the nest module 130 and includes: a light source facing the open volume and configured to output light across a light plane; a directional light filter 144 coupled to the light source between the light source and the imaging volume 111, configured to pass light output from the light source substantially normal to the light plane, and configured to reject light output from the light source at angles other than substantially normal to the light plane; and a light module extension 148 installable between the directional light filter 144 and the enclosure 110 to increase the imaging volume 111 to accept a part of greater dimension. The controller 180 is configured to activate the light source, to trigger the camera to record an image, and to deactivate the light source during an imaging routine.

Figure 8:
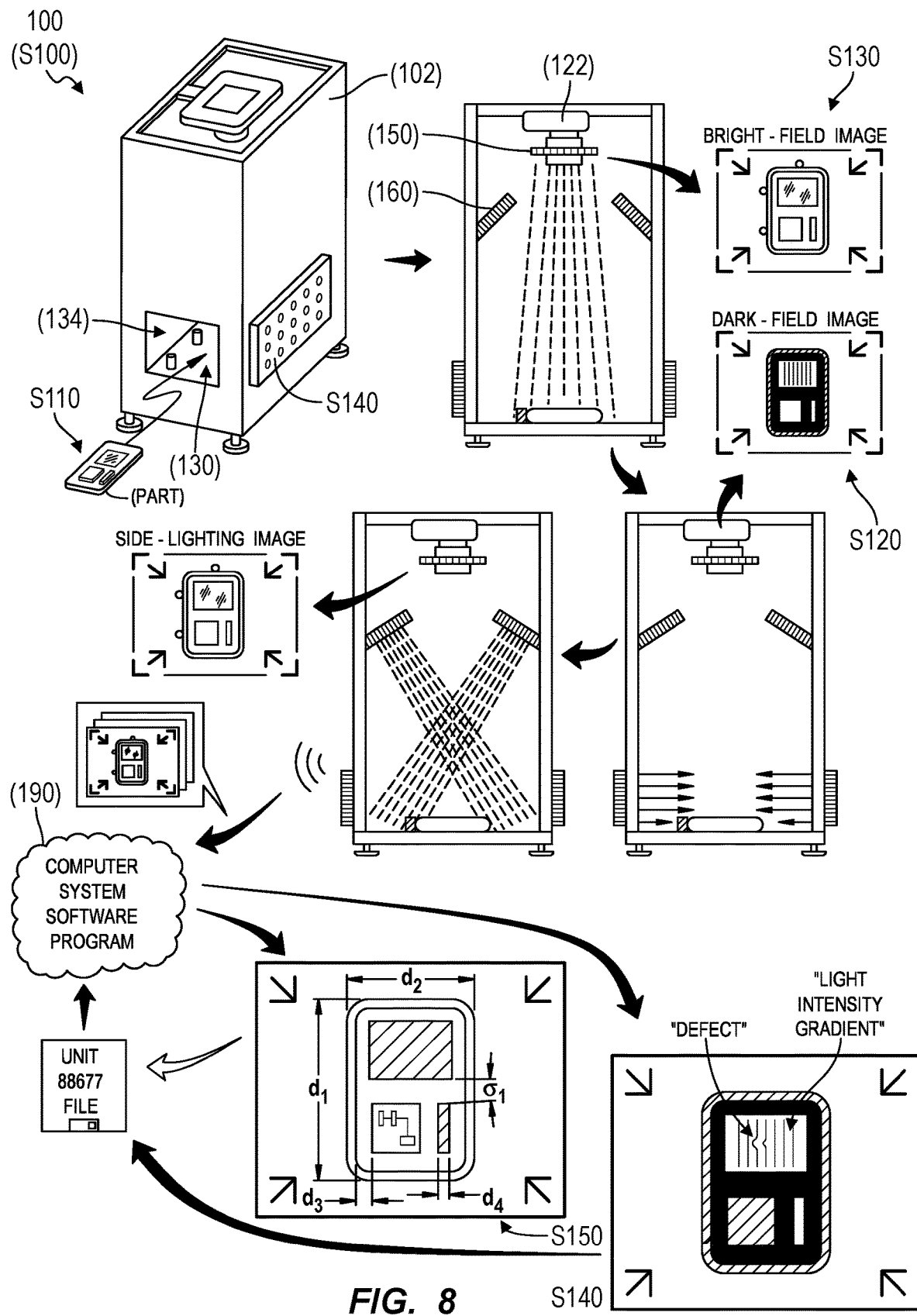
FIG. 8 is a flowchart representation of a method executed by the system.

As shown in FIG. 8, the system 100 can interface with a software program 190 executing on a local or remote computer system to perform a method including: at an optical inspection station interposed between assembly stations within an assembly line, receiving a first unit of a part on a receptacle 132 within the optical inspection station in Block S110; at a first time, activating a dark-field light element adjacent the receptacle 132, deactivating a bright-field light element overhead the receptacle 132, and recording a first image of the first unit of the first part in Block S120; at a second time, deactivating the dark-field light element, activating the bright-field light element, and recording a second image of the first unit of the first part in Block S130; detecting a surface defect on a surface of interest on the first unit of the first part based on an aberration in light intensity within a region of the first image corresponding to the surface of interest in Block S140; and extracting a real dimension of a feature on the first unit of the first part from the second image in Block S150.

2. Applications: Modularity

The system functions as a modular "kit" containing a limited set of components that can be assembled into various configurations of an optical inspection station 102 to accommodate and locate a range of products of various sizes within a nest over time, to light select surfaces of such parts, and to capture photographic images for optical inspection of such parts along assembly lines. In particular, the system 100 includes: a nest module defining multiple carrier receptacle locations offset from an image plane by a unique distance to enable the nest module to accommodate parts of different heights and/or one part in various orientations; a sensor module containing a camera configured to focus on the image plane and to record photographic images; an enclosure 110 configured to locate the sensor module relative to (e.g., above) the nest module with the image plane (e.g., the focal plane) of the optical sensor aligned to a surface of interest on a part placed in the nest module; and one or more lighting modules configured to couple to the nest module or to the enclosure and to cast directional light at a substantially uniform intensity across an imaging volume containing the image plane.

One or more enclosures, lighting modules, nests, and/or sensor modules can be assembled into an optical inspection station 102; and the optical inspection station 102 can then be installed within an assembly line, such as between two production stages, to sequentially receive units of a part at a particular production stage, to repeatably locate these units relative to the sensor module, to light one or more surfaces of interest of these units, and to record photographic images of these units before these units are removed from the optical inspection station 102 to a subsequent production stage. For example, components of one instance of the system 100 can be assembled into an optical inspection station 102 of a first configuration; and the first optical inspection station 102 can be installed along a first assembly line, such as between two production stations, to image units of a part or assembly at a particular manufacturing stage. In this example, components of one instance of the system 100 can be assembled into an optical inspection station 102 of a second configuration; and this second optical inspection station 102 can be installed along the first assembly line, such as at the end of the assembly line, to image units of the part or assembly once complete. As dimensional and/or aesthetic errors in units of these parts or assemblies are detected in photographic images of these units, these optical inspection stations 102 can be reconfigured, such as by adding, removing, and/or rearranging components, and installed at other locations along the same assembly line to gather photographic images of units of the part or assembly nearer sources of such errors. Similarly, an optical inspection station 102—assembled in one or various configuration from components of the system 100—can be reconfigured to image different types of parts at various stages of assembly and installed in various different assembly lines over time.

Furthermore, the system 100 can include components—such as a light source, a nest, and a sensor module—that perform their corresponding functions over a range of distances to the receptacle: such that a single configuration of an optical inspection station 102 can image units of one part in different orientations and at different stages of assembly as units of the part grow in size during assembly; and such that the optical inspection station 102 can image units of different unique parts spanning a range of different geometries over time; etc. without necessitating reconfiguration of the optical inspection station 102. Rather, only a carrier (e.g., a carrier, a jig) may be moved to a different carrier receptacle in the nest module or replaced with another carrier: to locate a new surface of interest on the same part at the image plane; or to locate a surface of interest on a different part of a different geometry at the image plane.

However, in preparation for imaging a part that exceeds a maximum or minimum range of operable distances of a component in the current configuration of the optical inspection station 102, the optical inspection station 102 can be reconfigured to accommodate the geometry of this new part, such as: by incorporating or removing enclosure components or expanding or contracting the enclosure to relocate the sensor module further from or nearer to the nest module; by adding, removing, or shifting lighting modules; etc. in order to accommodate a larger part or to improve lighting intensity and uniformity across a smaller area of a part.

For example, components of the system 100 can be assembled into one configuration of an optical inspection station 102 to repeatably capture photographic images of a smartwatch during assembly on one assembly line, to later repeatably capture photographic images of a smartphone during assembly on another assembly line, to later repeatably capture photographic images of a wireless router during assembly on yet another assembly line without necessitating modification to the optical inspection station 102 beyond replacement of a carrier defining datums for these various assemblies. However, the optical inspection station 102 can be reconfigured with additional enclosure components, light module extensions 148, light modules, and/or sensing modules, etc. to repeatably capture photographic images of desktop computer monitors, laptop computers, rack servers, medical devices, and garments on corresponding assembly lines. Components of the system 100 can also be assembled in an optical inspection station 102 of substantially minimal size necessary to reliably illuminate and image parts in order to consume substantially minimal space along an assembly line. The optical inspection station 102 can also be implemented outside of an assembly line, such as a post-production inspection room, to collect visual data of parts or assemblies.

3. Applications: Imaging

The system 100 is also configured to collect one or more images of a unit of a part placed in the nest module and to match lighting conditions within the optical inspection station to a type of qualitative or quantitative data sought from the part in its current stage of production. In particular, the bright-field lighting module is configured to output light substantially normal to the image plane (and therefore substantially perpendicular to a surface of interest on a unit of the part); such a bright-field lighting condition may produce distinct shadows at edges and corners on the unit, which may be captured in a bright-field image recorded by the optical sensor. A computer system can then implement computer vision techniques to: detect distinct features at steep shifts in color or light intensity in the bright-field image (e.g., by implementing edge detection techniques); and extract quantitative measurements of these features with relatively high accuracy from the bright-field image as a result of crisp delineation of edges and corners of the unit of the part shown in this bright-field image under bright-field lighting conditions.

However, such bright-field lighting may not sufficiently illuminate aesthetic defects—such as abrasions, dents, scratches, gouges, and surface finish abnormalities—in the bright-field image. Rather, light output by the bright-field lighting module may similarly illuminate both shallow surface defects and normal regions of the surface of interest on the unit of the part such that only minimal or even no shift in color or light intensity occurs in the bright-field image at the location of a shallow surface defect, thereby limiting accuracy of detection of such shallow surface defects by computer vision techniques. Therefore, the system 100 can also include a dark-field lighting module configured to output light predominantly or substantially perpendicular (e.g., +/−10° from perpendicular) to the surface of interest on the part. In particular, light output by the dark-field lighting module at an angle slightly below perpendicular to planar the surface of interest may illuminate normal regions of the surface of interest at a substantially uniform light level. However, light output by the dark-field lighting module may illuminate—with a significantly greater intensity—a surface defect (e.g., a burr) protruding above a normal region of the surface of interest. Similarly, light output by the dark-field lighting module may fail to illuminate a surface defect (e.g., a dent) extending below a normal region of the surface of interest. Therefore, a dark-field image captured by the optical sensor while the bright-field lighting module is active may depict: normal regions of the surface of interest illuminated substantially uniformly near a center light intensity value; convex surface defects illuminated with a significantly greater light intensity (e.g., shown as white "specks" or white spots in the dark-field image); and concave surface defects illuminated with a significantly lesser light intensity (e.g., shown as block spots in the dark-field image). A computer system can therefore implement computer vision techniques to detect normal surfaces, concave surface defects, and convex surface defects based on variations in light intensity of pixels in a dark-field image.

During an imaging routine, the controller can therefore: deactivate the dark-field lighting module, activate the bright-field lighting module, and trigger the optical sensor to record a bright-field image; and similarly deactivate the bright-field lighting module, activate the dark-field lighting module, and trigger the optical sensor to record a dark-field image, such as in rapid succession (e.g., in less than 500 milliseconds), to collect sufficient optical data to both generate quantitative (e.g., dimensional) values and qualitative (e.g., surface defect) values for a unit of a part currently occupying the optical inspection station. A computer system analyzing these images of the unit of the part can thus determine: whether a component or feature designed for the current production state of the unit is not present; whether absolute and relative dimensions of these components and features fall outside of tolerances specified for the part; whether mating (e.g., bearing) surfaces fail surface quality specifications; and/or whether an aesthetic defect is present on a surface of the unit that may be visible upon completion of the unit, any of which may trigger rejection or rework of the unit.

The system 100 can further include other lighting modules, such as a side lighting module arranged vertically between the dark-field lighting module and the bright-field lighting module and configured to output light (predominantly) at an angle between perpendicular and parallel to a surface of interest on a unit of a part placed on the nest module. In particular, the orientation and/or geometry of a shallow surface defect on the surface of interest may fail to yield a distinguishable difference in local illumination when illuminated by the dark-field lighting module or by the bright-field lighting module. However, illuminating the unit of the part with light incident on the surface of interest at (predominantly) a third, distinct angle may yield a distinguishable difference in local illumination of such shallow surface defects, thereby enabling the computer system to implement computer vision techniques to detect these shallow surface defects from a side lighting image recorded by the optical sensor when the side lighting module is active. Therefore, when the optical inspection station is outfitted with a side lighting module, the controller can deactivate the bright-field and dark-field lighting modules, activate the side lighting module, and trigger the optical sensor to record a side lighting image during an imaging routine. The computer system can then merge or otherwise analyze both the dark-field and side lighting images to generate quantitative values for the unit of the part occupying the optical inspection station during the imaging routine.

Therefore, the system 100 can include multiple lighting modules configured to be arranged in different orientations relative to the nest module and configured to project different angles and/or qualities of light onto a unit of a part placed in the nest module; and the controller can selectively activate these lighting modules and trigger the optical sensor to record images of the unit based on quantitative and qualitative optical inspection parameters 4. Sensor Module The sensor module 120 is transiently coupled to the enclosure and includes an optical sensor 122 defining a field of view directed toward an imaging volume defined by the enclosure. Generally, the sensor module 120 is configured to transiently (i.e., removably) couple to the enclosure over the nest module and includes an optical sensor 122 configured to record an image of surfaces of a unit of a part or assembly placed in the nest module below. For example, the optical sensor 122 can include: an area imaging sensor, such as an RGB or infrared, color or monochromatic, CMOS, CCD, or other camera configured to capture images (e.g., digital photographic color images) of units placed on the nest module. The optical sensor 122 can additionally or alternatively include: a 3D imaging sensor, such as stereoscopic cameras, a structured light imaging system, or other depth sensor (e.g., an infrared depth camera) configured to output depth images, such as in the form of 3D point cloud images. Furthermore, the optical sensor 122 can include a lens focused to the image plane, defining the field of view including the net module, and defining a viewing axis perpendicular to the nest module.

However, the sensor module 120 can include one or more sensors of any other type. For example, the sensor module 120 can include an electronic test instrument (e.g., an oscilloscope and probes), a weighing station including a scale, a surface profile station including a CNC surface profile gauge, or any other optical, acoustic, thermal, or other type of contact or non-contact sensor. (Alternatively, the system 100 can include one or more sensors, sensor actuators, etc. distributed across multiple modules.) The sensor module 120 can further include a data bus configured to offload these images and/or other sensor data from the optical sensor 122—such as to a remote database, to the controller, or to a connected computing device (e.g., a laptop computer)—and the sensor module 120 can further house the controller as described below.

5. Enclosure

The system 100 includes an enclosure 110: defining an imaging volume 111 and a window 116 adjacent the imaging volume 111; configured to support the sensor module over the nest module; and configured to locate bright- and dark-field lighting modules relative to the sensor module and the nest module.

5.1 Discrete Enclosure Elements

In one implementation, the enclosure 110 includes a set of enclosure 110 elements of various heights, and a subset of these enclosure 110 elements can be assembled (e.g., stacked): to transiently couple the sensor module to the nest module such that the image plane of the optical sensor (approximately) intersects a surface of interest on a unit of a part placed in the nest module; and to define an imaging volume 111 between the sensor module and the nest module. In this implementation, the system 100 includes a set of stackable primary and extension enclosure 110 elements that can be assembled (e.g., with fasteners or with clamps) in various configurations to achieve imaging volumes 111 of various widths and depths and to achieve various distances between the optical sensor and the nest module in order to accommodate units of various parts of various sizes and geometries placed on the nest module. For example, the system 100 can include a primary enclosure 110 element configured to mate with the nest module on one end and with the sensor module at the opposite end, and the primary enclosure 110 element can span a height corresponding to a length of a standard, preset, preferred, or locked focal plane of the optical sensor (or other sensor) in the sensor module. The front of the primary enclosure 110 element can also define a window 116 to the imaging volume 111 to provide an operator room to install and remove a unit of a part into and out of the nest module during operation.

In this implementation, the system 100 also includes enclosure 110 extensions that can be installed between the primary enclosure 110 element and the nest module to increase the offset distance between the sensor module and the nest module, as shown in FIG. 3. For example, the system 100 can include one of each of a 1"-, 2"-, 4,"-, and 8"-tall enclosure 110 extensions that can be installed on the primary enclosure 110 element to enable parts from ~0" wide in one dimension to parts more than 15" wide in one dimension to be imaged in the optical inspection station.

In this implementation, the enclosure 110 can include opaque closing panels 114 (or walls, surfaces) enclosing its periphery and configured to block light ingress into and light egress from the enclosure 110, as shown in FIG. 1. Furthermore, the enclosure 110 can include integrated power and data lines that connect the sensor module and the lighting module(s) to a power supply and to the controller. For example: the controller can be integrated into the sensor module; a power supply can be integrated into the nest module; and the enclosure 110 can include power and data lines terminating in a common plug 118 at each available mounting junction for the nest module, lighting modules, and the sensor module, as shown in FIGS. 1, 2, and 3. When a module is mechanically connected to the enclosure 110, the adjacent plug 118 can also be inserted into an adjacent plug 118 receptacle; thus, when the optical inspection station is fully assembled, the enclosure 110 can distribute power to each discrete electrical component within the optical inspection station and can connect the controller to each controllable module to enable the controller to selectively actuate components in these other modules. Alternately, each module can include a wireless transceiver, and the controller can pair with controller actuators in each other module over wireless communication protocol. However, the enclosure 110 can function in any other way to locate the sensor modules relative to the nest module and lighting module(s).

5.2 Expanding Chassis

In another implementation, the enclosure 110 can include: an expandable (e.g., telescoping) chassis; and a set of shear panels that can be added and removed to the expandable chassis to reinforce the enclosure 110 in various configurations. Alternatively, in this implementation, the enclosure 110 can include an opaque accordion or bellows defining an exterior wall arranged about the expandable chassis, configured to accommodate expansion and contraction of the chassis, and configured to block light ingress into the imaging volume in.

5.3 Framing Elements and Closing Panels

In yet another implementation, the enclosure 110 includes: a set of chassis elements 112, such as slotted aluminum framing elements transiently assemblable into chassis of various geometries; and a set of closing panels 114 configured to transiently mount to a chassis defined by an assembled set of chassis elements 112 to enclose the sensor module, the nest module, the dark-field lighting module, and the bright-field lighting module within the first chassis. For example: a first subset of chassis elements 112 can be transiently assembled into a first chassis; and a first subset of closing panels 114 can be mounted to the first chassis to transiently enclose the sensor module, the nest module, the dark-field lighting module, and the bright-field lighting module within the first chassis to define a first imaging volume 111 of a first geometry for imaging units of a first part. In this example: a second subset of chassis elements 112 can be transiently assembled into a second chassis; and a second subset of closing panels 114 can be mounted to the second chassis to transiently enclose the sensor module, the nest module, the dark-field lighting module, and the bright-field lighting module within the second chassis to define a second imaging volume 111 of a second geometry for imaging units of a second part different from the first part.

In this implementation, the chassis elements 112 and closing panels 114 can be assembled with threaded fasteners, clamps, or fasteners of any other type. Therefore, the system 100 can be supplied to a user or manufacturer with a set of chassis elements 112 of various lengths, closing panels 114 of various lengths and widths, and a set of fasteners; the user or manufacturer can then assemble the enclosure 110 with a subset of these chassis elements 112 and closing panels 114 to achieve an optical inspection station of size sufficient to accommodate a part or assembly during production on an assembly line but not so large as to obstruct the assembly line. The user or manufacturer can then install the sensor, lighting, and other modules inside the enclosure 110 to complete the optical inspection station. The enclosure 110 can thus define the periphery of the optical inspection station, and other modules can be mounted inside the enclosure 110 as shown in FIG. 7.

However, the enclosure 110 can define any other geometry and include any other components assemblable or reconfigurable in any other way to modify a distance between a bottom of the enclosure 110 (where the nest module may be mounted) and the top of the enclosure 110 (wherein the sensor module may be mounted) and to accommodate parts of any other size.

5.4 Conveyor Interface

In another implementation, the enclosure 110 defines a cage with open sections between the nest module and sensor module, such as in the form of a single locating post or three or four corner posts (transiently) coupled to corners of the nest module and sensor module. For example, the enclosure no can define a rigid structure that locates the sensor module over a conveyor, wherein the conveyor defines the nest module and automatically and sequentially indexes carriers containing units of a part into an imaging position under the sensor module. However, the enclosure 110 can define any other form or geometry to transiently mount or locate the sensor module to the nest module.

6. Nest Module

The nest module 130 is transiently coupled to the enclosure adjacent the imaging volume opposite the sensor module and includes a receptacle 132 configured to locate a surface of interest on a first unit of a first part at an image plane of the optical sensor. Generally, the nest module 130 can be mounted to the bottom end of the enclosure—opposite the sensor module—and function to accurately and repeatably constrain a unit of a part relative to the enclosure—and therefore relative to the sensor module—as an image of the unit of the part is recorded by the optical sensor.

6.1 Single-Stage Nest

In one implementation, the nest module 130 defines a single carrier receptacle 132 configured to transiently receive and constrain a jig; the jig can define features that function to locate a unit of a part in a particular orientation of interest for a given stage of assembly. While the optical inspection station is in operation and records images of units of a part at a particular production stage along an assembly line, an operator can intermittently place a unit of the part on the jig, which constrains the unit of the part in a known position (with some tolerance) relative to the sensor module, and the sensor module records an image of the unit automatically or in response to selection of a shutter or other input trigger by the operator. When a next unit of the part reaches the particular production stage, the operator can similarly place this next unit on the jig for imaging by the optical sensor.

In particular, the jig can define a set of datums configured to support and constrain a unit of a part with a surface of interest on the unit at a known distance above a reference surface of the jig (e.g., the back side of the jig). The carrier receptacle 132 can receive and locate the jig at a particular distance from the sensor module such that the surface of interest on the unit of the part aligns with the image plane of the optical sensor (i.e., such that the surface of interest is offset from a lens of the optical sensor by a distance substantially equivalent to a focal length of the lens).

The carrier receptacle 132 can additionally or alternatively be configured to receive and locate a part carrier (e.g., a carrier) on which a unit of a part is assembled during its manufacture (e.g., without an adapter between the carrier and the carrier receptacle 132). In particular, for an assembly line in which a unit of a part is mounted to a carrier (e.g., a fixture) and moved between production stations on the carrier, the nest module 130 can be configured to repeatably locate carriers such that a surface of interest on a unit of a part mounted to such a carrier aligns with the image plane of the optical sensor when the carrier is placed in the nest module 130 between consecutive production stations. Therefore, the carrier receptacle 132 can define a datum configured to: transiently receive a first carrier fastened to a first unit of a first part and to locate a surface of interest on the first unit of the first part at the image plane; and then transiently receive a second carrier fastened to a second unit of the first part—in replacement of the first carrier—and to locate a second surface of interest on the second unit of the first part at the image plane. A part can thus remain mounted to its carrier when imaged by the optical inspection station between product stations.

Yet alternatively, a jig can be integrated into (e.g., physically coextensive with) the nest module 130, and the jig and/or nest can also be configured to receive and repeatably locate multiple units of a part consecutively and/or simultaneously.

6.2 Multi-Stage Nest

In a similar implementation shown in FIGS. 1, 2, and 3, the nest module 130 includes a stepped receptacle 132 configured to locate a surface of a first part of a first height at an image plane and to locate a surface of a second part of a second height greater than the first height at the image plane. In particular, the nest module 130 can define a set of stepped or "terraced" carrier receptacles 132 at different positions (e.g., at different heights), wherein each carrier receptacle 132 is configured to receive and repeatably locate a carrier (e.g., relative to the sensor module via the enclosure), as shown in FIG. 2.

In this implementation, the nest module 130 defines a set of steps adjacent the window and rising toward the imaging volume, wherein each step is configured to receive and locate a carrier or jig at a unique distance from the imaging volume, wherein the carrier or jig defines a datum configured to repeatably locate units of a part. For example, the nest module 130 can define a widest carrier receptacle 132 nearest the sensor module and a narrowest carrier receptacle 132 furthest from the sensor module; a wider carrier can therefore be loaded into the nest module 130 to constrain a unit of a part nearer the sensor module, and a narrower carrier can be loaded into the nest module 130 to constrain a unit of a part further from the sensor module. Each carrier receptacle 132 can define a horizontal planar surface about a closed rectangular frame; a carrier receptacle 132 can thus define a window that is wider and longer than a carrier receptacle 132 immediately below it. Alternatively, each carrier receptacle 132 can define two parallel and opposing ledges in a common plane; each carrier receptacle 132 can be open on each end to enable carriers of similar lengths but different (i.e., height-dependent) widths to be installed in the nest module 130 over time. A carrier can thus be set in a carrier receptacle 132 of a corresponding size in the nest module 130, and the carrier can be constrained in vertical translation along a Z-axis of the optical inspection station and in rotation about X- and Y-axes of the optical inspection station by the carrier receptacle 132 and the weight of the carrier on the carrier receptacle 132. A carrier can additionally or alternatively be constrained to a carrier receptacle 132 within the nest module 130 by one or more fasteners, magnets, clamps, or other features.

By defining multiple terraced carrier receptacles 132, a nest can accept relatively thin (e.g., 0.5" thick) carriers or jigs to locate units of a part at a consistent distance from the sensor module as the part grows in dimension (e.g., from 0.1" thick to 8" tall) over the course of assembly and/or as units of the part are constrained in different orientations for imaging within one optical inspection station or within multiple like (i.e., similarly-configured) stations. Furthermore, because optical distortion within an image recorded by the optical sensor on the sensor module may be a function of camera focal length (e.g., zoom) and distance from the optical sensor to a surface of interest on a unit of a part (e.g., the top surface of the unit directly in the field of view of the optical sensor), the nest module 130 can support multiple possible carrier positions that enable the surface of interest on a unit—regardless of the orientation of the part—to be located within a narrow distance range from the sensor module by a jig or carrier without necessitating reconfiguration of the optical inspection station or use of a thicker (and therefore heavy and/or more expensive) carrier. Similarly, the lighting module can be configured to spread light substantially uniformly over a vertical distance range, and the nest module 130 can therefore also define multiple possible carrier positions that enable the surface of interest on a unit to be located within the vertical distance range lit by the lighting module without necessitating repositioning of the lighting module or alternation of light spreading by the lighting module.

Furthermore, thickness of a carrier or depth of a recess cut in the carrier to receive a unit of a part can be controlled to locate the surface of interest on the unit of the part (e.g., the top surface of the unit) within a relatively tight tolerance of the image plane of the optical sensor module. For example: the nest module 130 can define a 0.25" step height between carrier receptacles 132; and carriers 0.5" thick can be fabricated to receive and constrain parts in pockets up to 0.25" in depth in order to locate the top surface of these parts at a predefined image plane of the optical sensor (within a tolerance of +/−0.010").

In one example, a first carrier can be fabricated to repeatably locate a unit of a first part at a first stage of assembly in a first orientation and to seat within a first carrier receptacle 132 within the nest module 130 of a first optical inspection station such that, in the first orientation, a surface of interest on the unit of the first part is positioned at a preset image plane at a known distance from the sensor module or within a narrow distance range from the sensor module. In this example, as additional components are installed on units of the part at later stages of assembly, these units may grow in one or more dimensions. A second carrier can be similarly fabricated to repeatably locate a unit of the first part at a second, later stage of assembly in the same or other orientation and can be configured to seat within a second (e.g., lower) carrier receptacle 132 within the nest module 130 of a second identical optical inspection station such that, in this orientation, a surface of interest on the unit of the first part at the second stage of assembly is positioned at the image plane or within the same narrow distance range from the sensor module. At a later date and in another assembly line, the same optical inspection stations can accept other custom carriers or jigs to locate units of a second part—different from the first part—in various orientations and at various stages of assembly without modification to the enclosure, nest, or sensor module.

The nest can define multiple possible vertical carrier positions relative to the sensor module to enable one configuration of one optical inspection station to accept different types of parts, units of the same part in different stages of assembly, and/or different orientations of the same unit of a part over time and can locate various surfaces of interest of such units in alignment with a preset image plane of the optical sensor without necessitating thicker carriers or reconfiguration of the optical inspection station to relocate the nest module 130 relative to the sensor module. Therefore, the nest module 130 can define a step height between adjacent carrier receptacles 132 that corresponds to a range of distances in which a surface of interest on a unit of a part may fall in order to yield optical distortion in a region of an image—captured by the sensor module—within an acceptable or known range of optical distortion. In particular, by including terraced carrier receptacles 132, like optical inspection stations configured to image different surfaces of a unit of a part during assembly can locate surfaces of this unit at substantially common distances from cameras in these like optical inspection stations such that images recorded by these cameras exhibit similar optical distortion modes and magnitudes.

In one example, multiple like stations—assembled from like enclosure elements, lighting modules, and sensor modules—are interspersed along a smartphone assembly line, and each optical inspection station is loaded with a carrier configured to locate a smartphone unit in a particular orientation corresponding to a surface of interest from one or more preceding assembly operations along the assembly line. Each optical inspection station can thus be configured to capture one image of each of the front (e.g., screen area), the back, one side (e.g., around volume control buttons), and/or the bottom (e.g., around charging and data port(s)) of the smartphone unit throughout assembly. Because the length of each side of the smartphone may differ significantly (e.g., a smartphone 0.3" thick by 3.5" wide by 6.5" tall): a first carrier—orienting the smartphone unit face down for imaging of the front of the smartphone unit and in a 0.05" recess—can be installed in the top carrier receptacle 132 in the first nest of a first optical inspection station; a second carrier orienting the smartphone unit on its side can be installed in a second carrier receptacle 132 (e.g., 3.25" below the first receptacle 132) in the second nest of a second optical inspection station; and a third carrier—orienting the smartphone unit on its top for imaging of the bottom of the smartphone unit—can be installed in a third carrier receptacle 132 (e.g., 6.25" below the first receptacle 132) in the third nest of a third optical inspection station. During assembly, a smartphone unit can be placed in each of the first, second, and third stations to record images of the front, side, and bottom of the smartphone unit with the front, side, and bottom surfaces of the smartphone unit at substantially similar distances from cameras in the first, second, and third stations when these front, side, and bottom images of the smartphone unit are recorded. With the first, second, and third stations containing like lighting modules arranged at similar positions relative to the first, second, and third nests, respectively, these top, side, and bottom surfaces of the smartphone unit can be imaged under similar lighting conditions without necessitating modification of a lighting module within any of the first, second, and third stations.

Therefore, the nest module 130 can include terraced carrier receptacles 132 that enable installation of carriers in different vertical positions such that surfaces of interest on parts loaded into these carriers over time are located at the image plane, thereby precluding a need to adjust the focal length and focus of the optical sensor over time. A carrier for a part (or various carriers for the same part) can also be loaded into various carrier receptacles 132 in the nest module 130 to locate a surface of interest on a part loaded into the carrier at various corresponding image planes. The controller can adjust the focus of the optical sensor (and not the focal length of the optical sensor) accordingly to bring the surface of interest on the part into focus for each image plane before an image of the part at each vertical position is recorded, thereby enabling the optical inspection station to record images of the part over different X-Y areas. In particular, a carrier can be installed in one carrier receptacle 132 in the nest module 130 to achieve a corresponding "zoom level" for a surface of interest of a part loaded into the carrier without modifying a focal length of the optical sensor.

6.3 Inverted Multi-Stage Nest

In a similar implementation, an optical inspection station includes a nest defining an inverted stack of terraced carrier receptacles 132 with the narrowest carrier receptacle 132 interposed between a larger carrier receptacle 132 below and the sensor module above, as shown in FIG. 1. The nest module 130 can thus define a narrowest carrier receptacle 132 nearest the sensor module and a widest carrier receptacle 132 furthest from the sensor module: such that a wider carrier can be loaded into a lower carrier receptacle 132 in the nest module 130 to constrain a surface of a larger part at the image plane (or within a target distance range of the sensor module); and such that a narrower carrier can be loaded into a higher carrier receptacle 132 in the nest module 130 to constrain a surface of a smaller part at the same image plane (or within the same target distance range of the sensor module).

In this implementation, a carrier can be installed in the nest module 130 from below (e.g., from a direction opposite the sensor module) and fastened to the underside of a carrier receptacle 132, such as with a mechanical fastener, a clamp, detents, a locking pin, and/or magnets, etc. The bottom surface of a carrier receptacle 132—which may be positioned at a known distance from the sensor module given the size of the enclosure arranged between the nest module 130 and the sensor module—can define a datum that locates the surface of interest on a carrier on which a unit of a part is placed for imaging. Therefore, in this implementation, the thickness of a carrier may not affect the vertical position at which a unit of a part is located relative to the image plane.

6.4 Stepped Nest

In yet another implementation, the nest module 130 can define multiple carrier receptacles 132, wherein each carrier receptacle 132 defines a rectangular frame of a common cross-section or a pair of opposing ledges of a common offset distance, and wherein the carrier receptacles 132 are stacked vertically by a distance sufficient to define a ledge on which a carrier may be repeatably located. For example, the carrier receptacles 132 can be laterally offset, as shown in FIG. 3, or stacked vertically to form a vertical rack with multiple coaxial carrier receptacles 132.

7. Lighting Modules

The system further includes lighting modules configured to project artificial light into the imaging volume and to illuminate surfaces of a unit of a part located on the nest module in preparation for recording an image of the unit at the sensor module. In particular, the system 100 can include one or more dark-field lighting modules 140 configured to mount to the side of the enclosure or to the side of the nest module and to illuminate surfaces of a part located on the nest module at substantially high angles of incidence (e.g., 90°+/−5°) relative to the viewing axis of the optical sensor in preparation for recording a dark-field image, which may be particularly suitable for detecting defects (e.g., scratches, nicks, abrasions, tool marks, depressions, burrs, etc.) on illuminated surfaces of the unit of the part. The system 100 can also include one or more bright-field lighting modules 150 configured to mount over the imaging volume such as within the sensor module and to illuminate surfaces of a unit of a part located on the nest module at substantially low angles of incidence (e.g., 0°+/−10°) relative to the viewing axis of the optical sensor in preparation for recording a bright-field image particularly suitable for detecting edges of features on a unit of the part, which may enable relatively accurate extraction of quantitative dimensions of these features of the unit. As shown in FIGS. 7 and 8, the system 100 can further include a side lighting module 160: arranged vertically between a dark-field lighting module adjacent the nest module and the bright-field lighting module 150 over the nest module; and including a side light source 162 configured to project light onto a surface of interest on a unit of a part at (predominantly) an angle between light output (predominantly) by the dark-field lighting module 140 and light output (predominantly) by the bright-field lighting module 150.

7.1 Dark-Field Lighting Module

Figure 4:
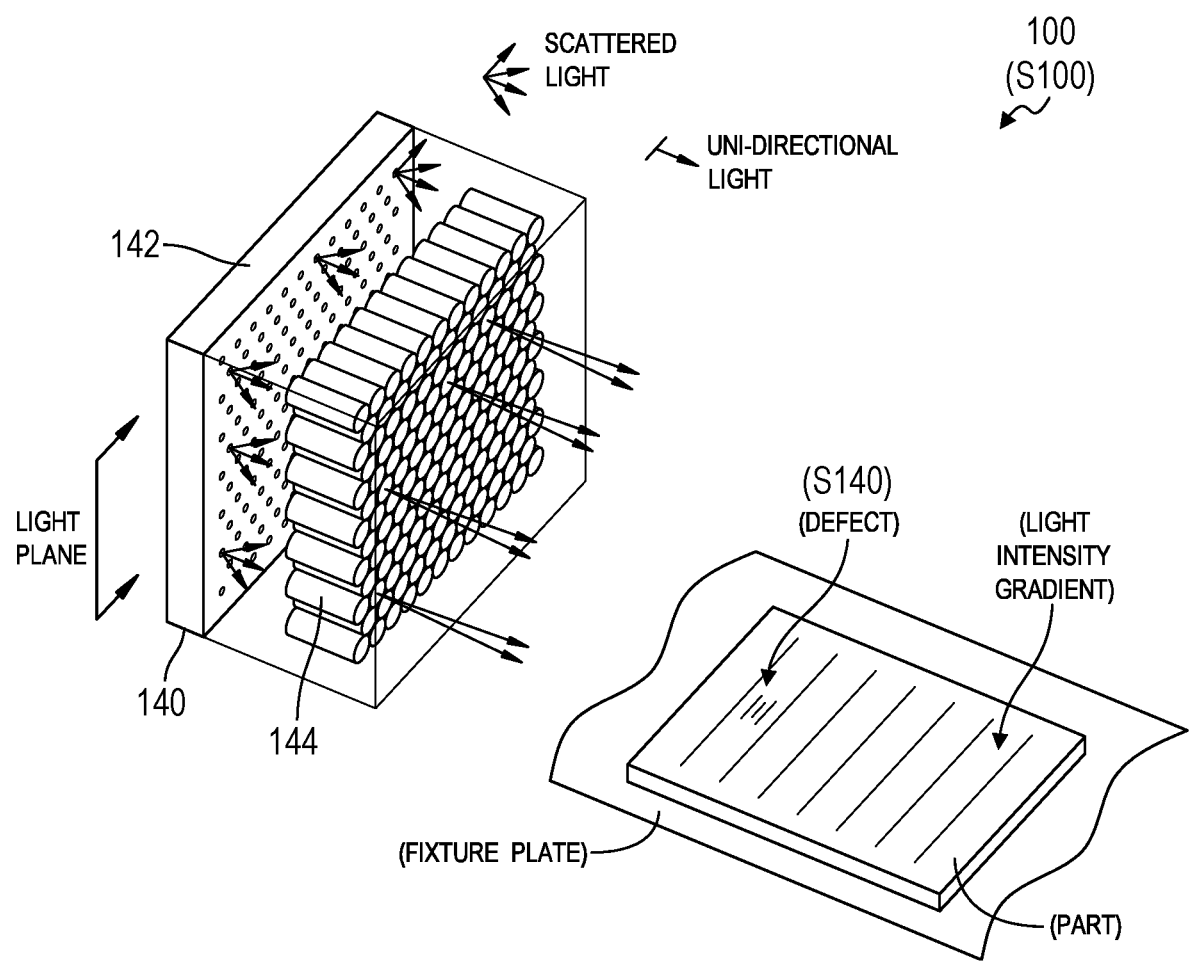
FIG. 4 is a schematic representation of one variation of the system.

In one implementation shown in FIGS. 4 and 7, the dark-field lighting module 140: includes a dark-field light source 142 configured to output light across a light plane; includes a directional light filter 144 extending across the dark-field light source 142, configured to pass light output by the dark-field light source 142 substantially normal to the light plane, and configured to reject light output by the dark-field light source 142 substantially nonparallel to the light plane; and is configured to transiently couple to the enclosure proximal the nest module with a normal axis of the light plane substantially perpendicular to the surface of interest on a unit of a part placed in the nest module.

7.1.1 Dark-Field Light Source

Generally, the dark-field lighting module 140 includes a light source facing the open volume and configured to output light across a light plane, as shown in FIG. 4. In one implementation, the dark-field light source 142 of the dark-field lighting module 140 includes a grid array of light elements arranged across the light plane. For example, the light source can include: a set of cold-cathode fluorescent lamps (CCFLs) spanning the light plane; a two-dimensional array of LEDs spanning the light plane; or a planar light guide spanning the light plane and one or more rows and columns of LEDs arranged about the perimeter of the light guide. However, the light source can include any other light source type configured to output light across an area (e.g., the light plane) or cluster of light sources (e.g., point sources) that cooperate to output light across an area.

7.1.2 Angle of Incidence

The dark-field lighting module 140 includes a directional light filter 144: coupled to the light source between the light source and the imaging volume; configured to pass light output from the light source substantially normal to the light plane; and configured to reject light output from the light source at angles other than substantially normal to the light plane, as shown in FIG. 4. In particular, the directional light filter 144 functions to limit the maximum angle between light rays passed from the light source into the imaging volume between the nest module and the sensor module, thereby limiting the angle of incident light rays on the surface of a part—set in the nest module—at a similarly narrow angular range.

For example, the light source can output light rays at angles between ~+85° to ~−85° from the light plane, but the directional light filter 144 can limit the maximum angle between light rays passed into the imaging volume to ~+5° to ~−5° and reject (e.g., absorb or reflect) light rays incident on the directional light filter 144 at angles outside of this angular range. In this example, the directional light filter 144 and a normal axis of the light plane can be substantially perpendicular to the viewing axis of the optical sensor lens and substantially parallel to the surface of interest on the nest module such that lights rays passed by the directional light filter 144 are substantially perpendicular to the viewing axis of the optical sensor. Furthermore, when a unit of a part is placed in the nest module (or in a carrier installed in the nest module) with a planar surface of the part facing the sensor module (e.g., a surface of a touchscreen, the back of a smartphone case, etc.), the directional light filter 144 can flood this surface of this unit with light rays that reach the surface of the part over a similarly limited range of angles (e.g., ~+5° to ~0°). Such uniformly low angles of incidence of light rays reaching this planar surface may limit angles of light rays reflected from this planar surface to a similarly narrow range of angles (e.g., ~+5° to ~0), thereby: limiting or eliminating light rays reflected from the light source directly into the optical sensor at normal (or "defect-free") areas on this planar surface; reducing glare on such defect-free areas of the planar surface at the optical sensor; and enabling a remote computer system (or the controller locally) to accurately and repeatably characterize instances of glare that do occur within a dark-field image of the unit—recorded by the optical sensor during an imaging routine—with a defect, such as a scratch, depression, burr, or tooling mark.

In particular, because the dark-field lighting module 140 projects light substantially horizontally and substantially uniformly across the image plane, a light intensity—at a discrete region on a surface of interest on a unit of a part—that differs significantly from an average or median light intensity from a larger surface nearby may indicate a superficial defect at this discrete region of the unit. An optical sensor can thus record a dark-field image of a unit while the dark-field lighting module 140 is active, thereby enabling a remote computer system (or the controller locally) to implement computer vision techniques to: detect the unit of the part in the dark-field image; detect a "normal" light intensity across a surface of interest in the dark-field image; detect an abnormal low-light-intensity region and/or an abnormal high-light-intensity region within this surface of interest in the dark-field image; and correlate this low-light-intensity region and/or high-light-intensity region with a surface defect on the unit.

Furthermore, such uniformly low angles of incidence of light rays reaching the surface of a part in the imaging volume can yield substantially uniform lighting of this surface over a range of distances from the light source such that one configuration of the optical inspection station—with one or more light source and directional light filter 144 pairs (i.e., dark-field lighting modules 140) in position about the imaging volume—can be operated within one assembly line or across multiple unique assembly lines to light different surfaces of difference sizes and geometries on one part in different orientations and to light various surfaces of different parts without necessitating repositioning of the dark-field lighting modules 140. In particular, each aperture in the directional light filter 144 can pass light output from only a relatively small, adjacent area of the light source, but the aperture rejects light output by all other regions of the light source. Therefore, the intensity of light passed by an aperture proximal the center of the light source may be substantially similar to the intensity of light passed by an aperture proximal the perimeter of the light source, thereby yielding both substantially uniform light intensities passed by all apertures in the directional light filter 144 and substantially uniform intensities of light incident across the width and depth of a surface—of a part placed in the nest module—that falls within the range of distances from the directional light filter 144 described above. The directional light filter 144 can also function to obscure all or a portion of the light source for an operator placing parts into and removing parts from the optical inspection station, thereby reducing eye fatigue from bright light output from the light source.

7.1.3 Directional Light Filter

Generally, the directional light filter 144 defines a panel extending across the dark-field light source 142 and defining an array of apertures. The directional light filter 144 can define: an array of apertures that pass light output from the light source behind it to the imaging volume ahead of it; and light stops between and along the length of each aperture that absorbs or rejects incident light output from the light source. In this implementation, the directional light filter 144 includes a thin structure—such as a film, sheet, or plate—that spans the width and height of the light plane and that is coated with a light-absorbing material (e.g., a flat black paint) that absorbs incident light output by the adjacent light source. In this implementation, the thin structure also defines an array of apertures (e.g., perforations) that selectively pass incident light from the light source toward the imaging volume. For example, the thin structure can define a skewed grid array of one-millimeter-diameter apertures at a fill ratio of 1:1 and can be offset from the light plane by a distance sufficient to limit the maximum angle between two light rays passed by one aperture to 10°. In this implementation, to decrease the maximum angle of light rays passed by the apertures (i.e., decrease the angle of incidence), the apertures can be narrowed in cross-section (e.g., diameter) and/or the thickness of the structure can be increased, thereby lengthening each aperture; and vice versa. Similarly, in order to pass a greater proportion of light power output by the light source, the aperture fill ratio can be increased, and the apertures can be widened or shortened; and vice versa.

In another implementation, the directional light filter 144 includes an array of tubes bonded or otherwise assembled into a planar structure with the axes of the tubes substantially parallel and offset. For example, the directional light filter 144 can include a set of black polymer tubes assembled in a honeycomb-like structure. Thus, light rays incident on the inner (or outer) wall of a tube can be absorbed by the tube, and light rays substantially parallel to the axis of the tube—and thus not intersecting the tube—can pass through the tube on to the imaging volume. As in the foregoing implementation, to decrease the maximum angle of light rays passed by the apertures (i.e., decrease the angle of incidence): each tube—which defines an aperture—can be narrowed in cross-section (e.g., diameter); and/or the length of each tube can be increased. Therefore, a maximum relative angle of rays passed by the directional light filter can therefore be a function of a ratio of the thickness of the directional light filter (i.e., the length of each tube) and to the diameter or width of each tube or perforation.

In yet another implementation, the directional light filter 144 defines a set of horizontal slats (or "shutters") extending across the width of the light source and interposed between horizontal light stops similarly extending across the width of the light source. In this implementation, the height of the slats can be narrowed and the thickness of the directional light filter 144 increased to narrow the maximum angle between light rays passed from the light source into the imaging volume; and vice versa. However, the directional light filter 144 can define any other structure or geometry that passes light rays substantially normal to the light plane and that intersects and absorbs light rays exiting the light source at angles other than substantially normal to the light plane. A dark-field lighting module 140 can also include a diffusing layer interposed between the light plane and the directional light filter 144 and configured to improve uniform distribution of light communicated vertically and longitudinally across the directional light filter 144.

7.1.4 Polarized Filter

In this implementation, the sensor module can also include a polarizing filter arranged across the lens of the optical sensor (or other optical sensor) within its polarizing columns substantially perpendicular to the direction of light output by the dark-field lighting module 140 (i.e., with the polarizing filter parallel to the X-Y plane of the optical inspection station); the polarizing filter can thus reject or absorb light output by the dark-field lighting module 140 (e.g., through a light plane parallel to the Y-Z plane of the optical inspection station) and/or reflected off of surfaces of a part loaded into the nest module and incident on the polarizing filter beyond a limited range of angles relative to the Y-Z plane of the optical inspection station, thereby similarly limiting glare in the field of view of the optical sensor during capture of an image of the part.

7.1.5 Installation

A dark-field lighting module 140 can be configured to mount transiently (i.e., removably couple) to the enclosure (or to the nest module) proximal and perpendicular to the nest module, as shown in FIGS. 2 and 3. For example, the bottom end of the enclosure element can include a set of default features (e.g., fastener bores, receivers) that engage mating features on a dark-field lighting module 140 (e.g., threaded studs, assembly pins) to locate the dark-field lighting module 140 in a default position with the center of the light source and the directional light filter 144 pair substantially aligned with (or offset above) the image plane. In this example, if a part to be loaded into the optical inspection station exceeds a maximum height supported by the lowest carrier receptacle in the nest module, a secondary enclosure element can be installed between the enclosure element and the nest module. The light source and the directional light filter 144 can thus be coupled to the enclosure or to the nest module to output light toward the imaging volume substantially perpendicular to the viewing axis of the optical sensor on the sensor module above. Alternatively, a side lighting source and a directional light filter 144 pair (or the directional light filter 144 only) can also be pivotably mounted within the lighting module in order to enable alignment of the light source and directional light filter 144 pair to a surface of a part—placed in the nest module—not normal to the field of view of the optical sensor such that the directional light filter 144 passes light onto the surface of the part at an angle substantially normal to this surface. For example, the light module can enable the light source and/or directional light filter 144 to be pivoted by up to 15° in either direction from perpendicular to the viewing axis of the optical sensor. Similarly, the dark-field lighting module 140 can be pivotably coupled to the nest module or to the enclosure directly.

As shown in FIG. 3, the dark-field lighting module 140 can further include: a light module extension 148 installable between the directional light filter 144 and the enclosure to increase the imaging volume to enable a part of greater width or depth to be installed in the nest module. Generally, the light module extension 148 can be installed between the dark-field lighting module 140 and the enclosure (or the nest module) to offset the dark-field lighting module 140 from the nest module, thereby enabling the optical inspection station to accommodate parts of width or depth nearing (or exceeding) the width and depth of the nest module. In one example, a light module extension 148 can define a structure similar to a secondary enclosure element described above (or identical to a secondary enclosure element) and can include an opaque wall or structure surrounding an open internal volume and two open ends, wherein one end of the light module extension 148 is configured to couple to a dark-field lighting module 140, and wherein the opposite end of the light extension module is configured to couple to the side of the enclosure (or to the side of the nest module). In another example, the light module extension 148 defines a separate lighting enclosure with open internal volume—such as in the form of a box of width and/or depth greater than the width and depth of the enclosure—that couples to the nest module at its bottom, to the primary or other enclosure at its top, and to one or more dark-field lighting modules 140 on its sides. In this example, the light module extension 148 can thus define a larger imaging volume and can offset the nest module, enclosure, and dark-field lighting modules 140 from this larger imaging volume in order to accommodate this larger imaging volume. However, the light module extension 148 can define any other form and can function in any other way to offset a dark-field lighting module 140 (and/or other components of the system 100 from the imaging volume.

7.2 Bright-Field Lighting Module

As shown in FIG. 2, the system 100 can also include a bright-field lighting module 150 transiently coupled to the enclosure proximal the optical sensor and including a bright-field light source 152 configured to output light toward the surface of interest (e.g., toward the image plane and substantially parallel to the viewing axis of the optical sensor). Generally, a dark-field lighting module 140 described above may illuminate the width and breadth of a surface of an assembly unit part with directional light of substantially uniform intensity but may wash out edges of the unit or otherwise provide limited contrast between surfaces at different levels within the part. Therefore, the system 100 can also include a bright-field lighting module 150 that projects toward and substantially normal to the nest module in order to cast shadows (i.e., light intensity gradients) between surfaces of different levels in the unit. The controller (or a remote computer system) can then implement machine vision (e.g., edge detection) techniques to identify edges of the unit within a bright-field image based on these light intensity gradients.

Therefore, though the bright-field lighting module 150 may yield more glare as light output from the bright-field light source 152 is reflected by a surface of a part back toward the optical sensor, the bright-field lighting module 150 may also illuminate surfaces of a part in the nest module with greater contrast due to occurrence of shadows along edge features on the part. In one implementation, the bright-field lighting module 150 includes a ring of LEDs arranged in a circular pattern about a substrate and configured to mount to the sensor module, such as on the optical sensor concentric with and behind the lens of the optical sensor. The bright-field lighting module 150 can also include a directional light filter 144—as described above—with apertures coaxial with the viewing axis of the optical sensor lens such that the bright-field lighting module 150 projects light rays substantially normal to the image plane and at a substantially uniform intensity across surfaces of a part placed in the nest module below.

Therefore: the bright-field lighting module 150 can include an array of light elements arranged about the lens and facing downward toward the nest module and configured to project light vertically down onto a unit of a part placed in the nest module; and the dark-field lighting module 140 can include a dark-field light source 142 and directional light filter 144 that cooperate to project light laterally across the unit of the part (e.g., perpendicular to a viewing of the optical sensor).

However, the bright-field lighting module 150 can be of any other form and can be transiently mounted in any other orientation or position within the optical inspection station. For example, the system 100 can include one of or a combination of dark-field lighting modules 140, bright-field lighting modules 150, back lighting modules, dome lighting modules (e.g., a diffuse combination of side lighting and down lighting from multiple directions), and/or any other type of lighting module.

7.3 Side Lighting Module

In one variation shown in FIGS. 7 and 8, the system 100 further includes a side lighting module 160: arranged vertically between the dark-field lighting module and the bright-field lighting module 150; and including a side light source 162. Generally, the side lighting module 160 is configured to project light toward the nest module at (predominantly) an angle of incidence between normal to the nest module and perpendicular to the nest module, which may yield illumination characteristics on a surface of interest on a unit of a part different from the dark-field and bright-field lighting modules 150.

In particular, the nest module and carrier (or jig) cooperate to locate a unit of a part within the imaging volume such that a planar surface of interest on the part is normal to the field of view of the optical sensor and near (e.g., intersecting) the image plane of the optical sensor such that the full breadth and width of the area of interest is in focus when the optical sensor captures an image of the unit. The bright-field lighting module 150 can project light downward toward the unit, such as at an angle of incidence between 70° and 110° from the plane of the surface of interest, which may yield high visual contrast along edges of the unit and enable extraction of quantitative dimensional data from a bright-field image of the unit. Similarly, the dark-field lighting module 140 can project light across the unit, such as at an angle of incidence between −5° and 0° from the plane of the surface of interest, which may yield nearly uniform light intensity across the surface of interest except at superficial defects (e.g., dents, dings, scratches, burrs, etc.) and enable detection of quantitative and/or qualitative surface quality values from a dark-field image of the unit.

However, a surface defect on the surface of interest may extend parallel to the light plane of the dark-field lighting module 140 such that this surface defect is illuminated by the dark-field lighting module 140 with a light intensity similar to that of a normal surface nearby, thus reducing visual distinction between the surface defect and the normal surface. For example, a unit of a part can include an elongated scratch extending along the surface of interest normal to the light plane when placed in the nest module; the scratch can define a shallow entry angle and shallow exit angle within the narrow range of angles of light passed by the directional light filter 144 of the dark-field lighting module 140 such that the scratch is illuminated to a degree similar to that of a normal surface nearby, thereby limiting visual contrast between the scratch and the normal surface and preventing repeatable optical detection of the scratch in a dark-field image of the unit. Similarly, light projected onto the unit by the bright-field image may fully illuminate both the scratch and the normal surface, thereby preventing repeatable optical detection of the scratch in a bright-field image of the unit.

However, the system 100 can further include a side lighting module 160 arranged between the dark-field and bright-field lighting modules 150 and configured to project light toward the surface of interest at (predominately) an angle other than parallel and perpendicular to the surface of interest. For example, the side light source 162 of the side lighting module 160 can include an array of LEDs: arranged above the dark-field lighting module 140; arranged below the bright-field lighting module 150; set at a 45° pitch angle to the surface of interest; and configured to project light onto the surface of interest at (predominantly) an angle of incidence of 45°. In this example, the side lighting module 160 can also include a directional light filter 144 interposed between the side light source 162 and the nest module and configured to pass light from the side light source 162 to the nest module over a limited range of angles, as described above. Thus, the side lighting module 160 may project light onto a surface defect on a unit of a part at an angle of incidence distinct from light projected onto the unit by the dark-field lighting module 140, which may uniquely illuminate the surface defect to yield sufficient light intensity gradient between the surface defect and the normal surface nearby, thereby enabling optical detection of the surface defect via computer vision, as described below.

However, the side lighting module 160 can be of any other form and arranged in any other position inside an optical inspection station relative to the nest module.

7.4 Integrated Lighting Modules

In one variation, dark-field, bright-field, and/or side light elements are integrated into a single lighting module, such as a dome-shaped or conical lighting module in which the central axis of each light element is directed toward the nest module (e.g., to a common point on or near the carrier). In this variation, individual or groups of light elements can be independently-operable, and the controller can selectively activate individual light elements or groups of light elements to achieve a particular lighting condition across a surface of a part placed in the carrier during an imaging routine. For example, the system can include a single lighting module including a set of independently-operable light elements arranged over the nest module in a range of unique orientations, such as a range of unique pitch and yaw orientations such that each light element faces the nest module. In this example, the controller can: activate a first subset of light elements in the set of light elements in the lighting module and trigger the optical sensor to record a first image of a first unit of the first part placed in the carrier at a first time; and activate a first subset of light elements different from the first subset of light elements in the set of light elements in the lighting module and trigger the optical sensor to record a second image of the first unit of the first part at a second time different from the first time.

8. Configurations

As described above, components of the system 100 can be assembled into various configurations of an optical inspection station.

8.1 Multiple Lighting Modules

In one configuration shown in FIGS. 1 and 7, an optical inspection station is assembled with multiple dark-field lighting modules, including: a right dark-field lighting module installed on the enclosure element to the right of a window to the imaging volume and facing the imaging volume; and a left dark-field lighting module installed on the enclosure element to the left of the window to the imaging volume and facing the right dark-field lighting module. Thus, for a part or assembly loaded into the nest module and defining a surface—facing the optical sensor—of a width or depth greater than a depth of uniform light that one dark-field lighting module is capable of spreading across the imaging volume, the optical inspection station can include two opposing dark-field lighting modules facing the imaging volume. The left and right dark-field lighting modules can cooperate to light the full width and depth of the part or assembly with directional light of substantially uniform intensity. In this configuration, the optical inspection station can also include a reflective panel 146, such as in the form of a matte white gel, installed along the back of the imaging volume opposite the window at the front station. The reflective panel 146 can function to reflect incident light from the dark-field lighting modules back toward the part or assembly loaded into the nest module, thereby blending overlapping light rays output toward the center of the imaging volume by the left and right dark-field lighting modules to yield greater lighting uniformity across surfaces of the part or assembly facing the sensor module.

Therefore, an optical inspection station in this configuration can include a right dark-field lighting module transiently coupled to the enclosure with a first directional light filter arranged to the right of a window of the enclosure, perpendicular to the window, perpendicular to a surface of interest of a unit of a part loaded into the nest module, and facing the imaging volume of the enclosure. The optical inspection station can also include a left dark-field lighting module: including a second grid array of light elements arranged across a second light plane and configured to output light across the second light plane; including a second directional light filter including a second perforated panel extending across the second grid array of light elements, configured to pass light output by the second dark-field light source substantially normal to the second light plane, and configured to reject light output by the second dark-field light source substantially nonparallel to the second light plane; and transiently coupled to the enclosure with the second directional light filter arranged to the left of the window, perpendicular to the window, perpendicular to the surface of interest, and facing the dark-field lighting module.

In this configuration, the optical inspection station can also be outfitted with one or more side lighting modules, as shown in FIGS. 7 and 8. For example, the optical inspection station can include: a right side lighting module arranged over and oriented at 45° in pitch to the right dark-field lighting module; and a left side lighting module arranged over and oriented at 45° in pitch to the left dark-field lighting module. In a similar configuration, the optical inspection station can include: a lower right side lighting module arranged over and oriented at 30° in pitch to the right dark-field lighting module; an upper right side lighting module arranged between the lower right side lighting module and the bright-field lighting module and oriented at 60° in pitch to the right dark-field lighting module; a lower left side lighting module arranged over and oriented at 30° in pitch to the left dark-field lighting module; and an upper left side lighting module arranged between the lower left side lighting module and the bright-field lighting module and oriented at 60° in pitch to the left dark-field lighting module.

As described above, the left and right dark-field lighting modules can face each other (e.g., be offset by 180° about their yaw axes) and can cooperate to project light substantially parallel to their common roll axes. However, the optical inspection station can further include a center dark-field lighting module: interposed between and offset by 90° from the left and right dark-field lighting modules; facing the window of the enclosure; and configured to project light laterally across the nest module along a direction (predominantly) perpendicular to the roll axes of the left and right dark-field lighting modules. Similarly, the optical inspection station can include a center (or a center lower and a center upper, etc.) side lighting module interposed between the left and right side lighting modules.

Similarly, the left side lighting module can be angularly offset about its yaw axis from the left dark-field lighting module such that light output from the left side lighting module is non-parallel to the light output by the left dark-field lighting module in both vertical and horizontal planes. The left side lighting module may thus illuminate a surface defect on a unit of a part placed in the nest module differently from the left dark-field lighting module and may thus enable detection of the surface defect in a side lighting image, though this surface defect may not be visually distinguishable in a dark-field image. For example, the full length, depth, and width of an elongated scratch extending along a surface of interest on a unit of a part normal to the light plane of the left dark-field lighting module may be fully illuminated—like a normal (e.g., defect-free) surface nearby—by the left dark-field module. In a similar example, a burr extending along the surface of interest on the unit normal to the light plane of the left dark-field lighting module may be fully illuminated—like a normal surface nearby—by the left dark-field module. In these examples, this surface defect may therefore be visually indistinguishable from the normal surface in a dark-field image of the unit. However, by illuminating the surface of interest with light incident on the surface of interest at (predominantly) pitch and yaw angles different from light output by the left dark-field lighting module and by capturing images of the unit when select lighting modules are active, the optical inspection station can capture a set of images of the unit— during an imaging routine—that enable detection of the surface defect with a relatively high degree of accuracy. In this configuration, the right side lighting module can be similarly angularly offset from the right dark-field lighting module about its yaw axis.

Thus, in these configurations, the optical inspection station can include groups of discrete, independently-operable lighting modules arranged about a hemisphere above the nest module.

Similarly, the optical inspection station can be configured to receive and image a unit of a part defining a surface of interest non-normal to the viewing axis of the optical sensor, such as a curved, swept, or conical surface. The dark-field, side, and bright-field lighting modules can thus cooperate to illuminate regions of this surface of interest according to lighting conditions targeting extraction of quantitative values (e.g., dimensions of features) and detection of qualitative values (e.g., presence of a surface defect) on subregions of the surface of interest. The controller can thus record a sequence of images of the unit with select lighting modules activated during recordation of each image, and the remote computer system (or the controller locally) can extract quantitative and qualitative values of the unit from discrete regions of each image or merge these images into separate composite images for extraction of quantitative values and detection of qualitative values of the surface of interest.

However, the optical inspection station can include any other number of discrete, independently-operable lighting modules between the nest module and the sensor module.

8.2 Multiple Sensor Modules

In another configuration shown in FIG. 2, an optical inspection station is assembled with an upper sensor module containing a first camera facing the top of the nest module and a lower sensor module containing a lower camera facing the bottom of the nest module. In this configuration, the upper sensor module can be installed above and offset from the top of the nest module by a first enclosure, and the lower sensor module can be installed below and offset from the bottom of the nest module by a second enclosure. The carrier and the nest module can also feature open centers such that both the top and bottom surfaces of a part—placed on the carrier in the nest module—are visible to the first and second cameras, respectively, and the optical inspection station can include side and/or bright-field lighting modules on both sides of the nest module (e.g., side and bright-field lighting modules on the top side of the nest module and a bright-field lighting module—facing upward—only on the bottom side of the nest module). The controller can thus activate lighting modules on both sides of the nest module and trigger both the first and second cameras to record images substantially simultaneously during an imaging routine for a new unit of a part or assembly that is placed in the optical inspection station.

In yet another configuration shown in FIG. 3, an optical inspection station includes a first sensor module—including a first camera—arranged over and facing the top of the nest module and a second sensor module—including a second camera—arranged to the side of the nest module adjacent the imaging volume and substantially perpendicular to the first sensor module. In this configuration, the controller can trigger both the first and second camera to record images, such as simultaneously or sequentially, in order to collect photographic data of both the top and one side of a new part loaded into the nest module.

However, components of the system 100 can be assembled into an optical inspection station of any other configuration to illuminate and image a part or assembly of any other size or geometry.

9. Controller

The controller 180 is configured to selectively activate lighting modules, to trigger the optical sensor to record images, and to deactivate lighting modules during an imaging routine. Generally, the controller 180 functions to selectively activate one or more light modules and to selectively trigger the optical sensor to record images when a unit of part or assembly is placed in the nest module (e.g., on a carrier installed in the nest module).

9.1 Imaging Routine

In one implementation in which an optical inspection station is assembled with both dark-field lighting modules and bright-field lighting modules, the controller 180 can: first activate the dark-field lighting modules; trigger the optical sensor to record a dark-field image in Block S120; deactivate the dark-field lighting modules; activate the bright-field lighting module; trigger the optical sensor to record a bright-field image in Block S130; and finally, deactivate the bright-field lighting module during one imaging routine following insertion of a unit of part into the optical inspection station in Block S110. The controller 180 can then process these dark-field and bright-field images locally or offload these images to a remote computer system (e.g., a remote server) for processing in Blocks S140 and S150.

In a similar implementation shown in FIG. 7, the optical inspection station is assembled with: a left dark-field lighting module arranged on a left side of the window; a right dark-field lighting module arranged on a right side of the window facing the left dark-field lighting module; a left side lighting module arranged over the left dark-field lighting module and configured to output light predominantly nonparallel and predominantly non-perpendicular to the viewing axis of the optical sensor; a right side lighting module arranged over the right dark-field lighting module and including a right side lighting module configured to output light predominantly nonparallel and predominantly non-perpendicular to the viewing axis of the optical sensor; and a bright-field lighting module defining a ring of light elements arranged about a lens of the optical sensor. In this implementation, the controller 180 can sequentially: activate the bright-field lighting module and trigger the optical sensor to record a bright-field image of the unit of the part; deactivate the bright-field lighting module, activate the left side lighting module, and trigger the optical sensor to record a left side image of the unit of the part; deactivate the left side lighting module, activate the right side lighting module, and trigger the optical sensor to record a right side image of the unit of the part; deactivate the right side lighting module, activate the left dark-field lighting module, and trigger the optical sensor to record a left dark-field image of the unit of the part; and deactivate the left dark-field lighting module, activate the right dark-field lighting module, and trigger the optical sensor to record a right dark-field image of the unit of the part. Thus, the controller 180 can independently activate each lighting module and trigger the optical sensor to record one image per light module.

In a similar implementation shown in FIG. 8, the controller 180 can: selectively activate the left and right dark-field lighting modules simultaneously, which may flood the surface of interest with light predominantly parallel to the surface of interest and at substantially uniform intensity across the breadth and width of the surface interest; and then trigger the optical sensor to record a 0° dark-field image. In this implementation, the system 100 can also selectively activate a center dark-field lighting module simultaneously to record a 90° dark-field image. Furthermore, the controller 180 can: selectively activate the left and right side lighting modules simultaneously to record a 0° side field image; and selectively activate a center side lighting module to record a 90° side lighting image; etc. Thus, the controller 180 can selectively activate groups of lighting modules and trigger the optical sensor to record one image per group in order to achieve various lighting conditions on the surface of interest in a sequence of images of the unit.

9.2 Independently-Operable Light Elements

In a similar variation, each light element or group of light elements in each lighting module is independently-operable. The controller 180 can thus selectively activate one light element in one lighting module, activate a small subset of light elements in one lighting module, or activate subsets of light elements across multiple lighting modules to achieve a particular lighting condition on a surface of interest on a unit of a part loaded into the nest module before triggering the optical sensor to record an image. The controller 180 can repeat this process for a different combination of light elements in the lighting modules to achieve another distinct lighting condition at the surface of interest before triggering the optical sensor to record a second image.

9.3 Imaging Routine Triggers

The controller 180 can initiate an imaging routine automatically when an operator manually selects a shutter input on the optical inspection station, such as after inserting a unit of a part through the window and onto the nest module.

Alternatively, the controller 180 can automatically execute an imaging routine. For example, the system 100 can include a weight sensor 136 (e.g., a strain gauge, etc.) coupled to the nest module, such as between the nest module and the enclosure or incorporated into feet of the optical inspection station (as shown in FIG. 7) and configured to output a signal corresponding to a weight (i.e., a vertical force) on the nest module. In this example, the controller 180 can regularly sample the weight sensor 136 and then initiate an imaging routine: once a rate of fluctuation of an output of the weight sensor 136 falls below a threshold amplitude, which may indicate that the unit of the part has settled on the nest module and that the optical inspection station is not oscillating by an amplitude sufficient to induce noise in images recorded during the optical sensor; and/or once the output of the weight sensor 136 falls within a threshold difference (e.g., +/−5%) of a target or expected weight of the part at the current production stage. Therefore, the controller 180 can sample the weight sensor 136; and execute an imaging routine in response to a signal output by the weight indicating an increase in force on the receptacle representative of presence of a unit of a part and in response to temporal variation of the signal falling below a threshold amplitude.

In a similar implementation, the system 100 can include an accelerometer coupled to the nest module and configured to output a signal corresponding to vertical and/or horizontal accelerations of the nest module. In this implementation, the controller 180 can characterize a signal output by the accelerometer as placement of a unit of a part on the nest module and then execute an imaging routine once a signal read from the accelerometer indicates that the nest module or the optical inspection station generally is oscillating by less than a threshold amplitude following placement of the unit onto the nest module.

However, the controller 180 can execute an imaging routine in response to any other manual trigger or automatically-detected event.

9.4 Baseline Image and Lighting Module Power

In one variation, the controller 180 can also match output power (e.g., light flux) of the lighting modules to the shutter speed (i.e., exposure) of the optical sensor and to an ambient light level. For example, upon setup in an assembly line, the controller 180 can deactivate all light modules and trigger the optical sensor to record a baseline image at a preset or slow exposure. Based on a light intensity level in the baseline image, the controller 180 can: set a power output level of the dark-field lighting modules and/or a power output level of the down light modules to substantially overwhelm ambient light levels measured in the baseline image; and then set a surface defect exposure for the optical sensor based on the power output level of the dark-field lighting modules and set an edge detection exposure for the optical sensor based on the power output level of the down light modules. The controller 180 can then implement the dark-field lighting module and down light module power output levels and the surface defect and edge detection exposure times during subsequent imaging routines in order to generate a set of images of parts under similar lighting conditions and imaging parameters.

During each imaging routine, the controller 180 can also trigger the optical sensor to record a baseline image for each new part loaded into the optical inspection station, and the controller 180 (or the remote computing device) can later subtract or otherwise merge a baseline image with a dark-field image and with a bright-field image for each part passing through the optical inspection station.

However, the controller 180 (and/or remote computer system) can implement any other methods or techniques to control one or more lighting modules and sensor modules during operation of the optical inspection station. The controller 180 can also interface with a wired communication bus or a wireless transmitter to offload images and image metadata—captured by the optical sensor—to a local router, a local computing device (e.g., a laptop computer), or other local or remote computer system for additional processing and distribution to one or more users.

9.5 Weight Data

In one variation, the system 100 further includes a set of weight sensors 136 coupled to the nest module and configured to output signals corresponding to vertical forces distributed across the receptacle. For example, the system 100 can include four weight sensors 136 (e.g., strain gauges), each supporting one of four corners of the nest module on the enclosure or arranged in the nest under the carrier, as shown in FIG. 7. Prior to insertion of a unit of a part into the optical inspection station, the controller 180 can tare weight signals output by the weight sensors 136. Once a unit of a part is loaded into the optical inspection station to trigger an imaging routine, the controller 180 can read weight values from each weight sensor 136 and store these weight values alongside image data or in metadata of images recorded during the imaging routine before offloading these images and related data to a remote computer system for processing.

The remote computer system can then predict a location or region of the unit of the part that excludes a specified component or feature based on these weight values stored in the image metadata. In particular, the remote computer system can access target (e.g., typical, expected) total weight of the unit of the part, such as from a database; if the sum of the weight values recorded for the unit fall within a threshold difference of the target weight, the system 100 can predict that all components and/or features are present on the part. However, if the sum of the weight values recorded for the unit fall outside of the threshold difference of the target weight, the remote computer system can: access a target weight for each corner of the part; calculate differences between each discrete weight value—read from a corner of the nest module while the unit of the part was present in the optical inspection station—and a corresponding target weight for the part; and triangulate a location of a missing part (or extra part or feature) on the unit based on these weight differences. In particular, the remote computer system can: compute an amount of weight or mass that "missing" from the unit compared to an expected weight or mass of the unit (e.g., based on weights or masses of typical units); compute a magnitude and direction of a change in the center of mass of the unit compared to an expected center of mass (e.g., of typical units); and identify or predict a location of the missing mass based on the direction and magnitude of the center of mass change. Therefore, the remote computer system can estimate a specific location or region of the unit that may be missing a component based on weight values read from weight sensors 136—incorporated into the optical inspection station—during an imaging routine. The remote computer system can then selectively scan and/or focus deeper optical analysis to a region of the image representing this location on the unit to determine whether all designated components are present in this region of the unit.

10. Multiple Optical Inspection Stations on One Assembly Line

As described above, multiple instances of the system 100 can be assembled into optical inspection stations that are then installed along an assembly line, such as between production stations and/or at the terminus of the assembly line. For example, an enclosure, sensor module, nest module, dark-field lighting module, bright-field lighting module, and controller of a first instance of the system 100 can cooperate to define a first optical inspection station installed at a first location along an assembly line. In this example, a second optical inspection station can be installed at a second location offset from the first location along the assembly line, wherein the second optical inspection station includes: a second enclosure defining a second imaging volume and a second window adjacent the second imaging volume; a second sensor module transiently coupled to the second enclosure and including a second optical sensor defining a second field of view directed toward the second imaging volume; a second nest module transiently coupled to the second enclosure adjacent the second imaging volume opposite the second sensor module and including a second receptacle configured to locate a second surface of interest on the first unit of the first part at a second image plane of the second optical sensor; a second dark-field lighting module including a second dark-field light element and transiently coupled to the second enclosure proximal the second nest; and a second controller configured to, at a third time succeeding the first time and the second time, activate the second dark-field lighting module and trigger the second optical sensor to record a third image of the first unit of the first part. Thus, in this example, the first controller can implement methods and techniques described above to capture bright-field and dark-field images of units of a part at a first production stage, such as with a focus on a first surface of interest on these units (e.g., an internal PCB); and the second controller can implement similar methods and techniques to capture bright-field and dark-field images of units of a part at a second production stage, such as with a focus on a second surface of interest on these units different from the first surface of interest (e.g., an exterior surface).

However, any other number and configuration of such optical inspection stations can be installed along an assembly line to collect images of units of a part or assembly passing through the assembly line in real-time; a local or remote computer system can then process these images to detect functional and aesthetic defects on these units and issue prompts or notifications to discard or rework select units in (near) real-time during production.

11. Soft Good Module

Figure 5:
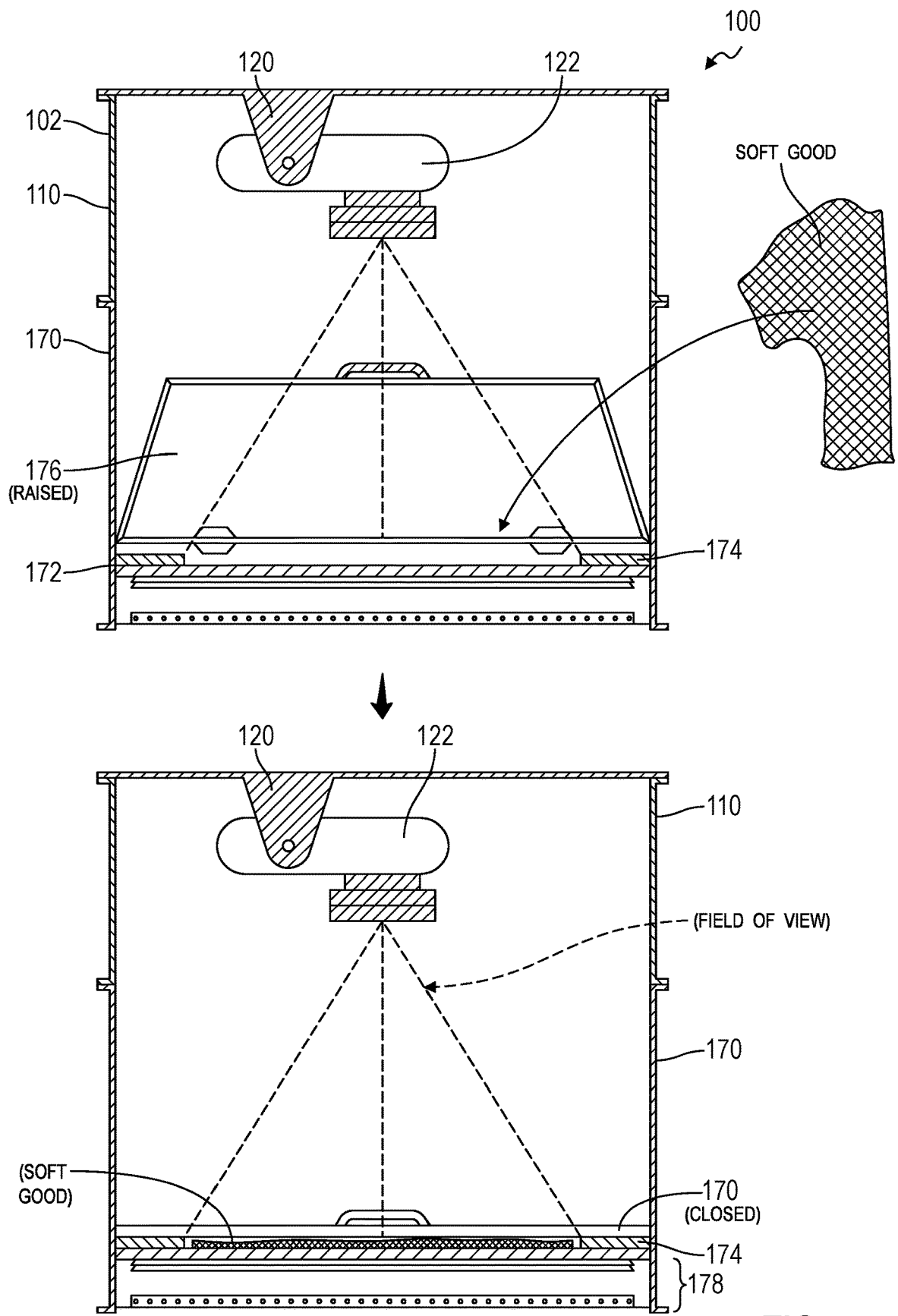
FIG. 5 is a flowchart representation of one variation of the system.

In one variation shown in FIG. 5, the system 100 further includes a soft good module 170, which includes: a platen 172 including a translucent material; a perimeter guide 174 arranged over the platen 172 and defining an open region approximating a perimeter of a soft good; and a lid 176 including a transparent material, arranged over the platen 172, operable in a raised position offset above the platen 172 to receive a unit of the soft good within the open region defined by the perimeter guide 174, and operable in a lowered position to flatten the soft good against the platen 172. Generally, in this variation, the soft good module 170 functions to approximately align a textile—such as a whole garment (e.g., a shirt, a hat) or a section of a garment—and flatten the textile between the platen 172 and the transparent lid 176 in preparation for imaging with a sensor module arranged overhead. Thus, in one configuration of the optical inspection station: the enclosure can transiently support the sensor module and locate the soft good module 170 in the field of view of the optical sensor and offset below the sensor module; the dark-field module can face the platen 172 of the soft good module 170 opposite the sensor module and output light through the platen 172 toward the sensor module; and the controller can activate the dark-field lighting module and trigger the optical sensor to record an image of the unit of the soft good illuminated from below by the dark-field lighting module.

In one implementation, the platen 172 defines a planar structure in a translucent material, such as frosted acrylic or polycarbonate, arranged over a diffuse lighting module 178. The diffuse lighting module 178 can include a cluster or array of lighting modules (e.g., white LEDs) projecting light predominately perpendicular to the planar surface of the platen 172 (e.g., parallel to a normal axis of the planar surface of the platen 172) and one or more diffusers interposed between the lighting modules and the platen 172 to spread light substantially uniformly across the platen 172. The diffuse lighting module 178 can also include a mirrored or reflective surface arranged across the lighting modules opposite the platen 172 to reflect light toward the platen 172. For example, a lighting module (e.g., a dark-field-type lighting module) can be arranged under the platen 172 and operated in a diffuse lighting configuration to illuminate a soft good placed in the soft good module 170. The platen 172 can thus diffuse light output from the dark-field lighting module across the soft good. The directional light filter of the dark-field lighting module can additionally or alternatively be replaced with a diffuser. Yet alternatively, a separate and distinct diffuse lighting module 178 can be coupled to or integrated into the soft good module 170 to illuminate a soft good from below.

Furthermore, the platen 172 can be offset below the sensor module, such as mounted to an enclosure opposite the sensor module, as described above and shown in FIG. 5, and the diffuse lighting module 178 can project light upward toward a soft good placed between the platen 172 and the lid 176.

The lid 176 can similarly define a planar structure in a transparent material, such as optically-clear acrylic. In one example, the lid 176 is hinged to the imaging volume opposite the window and includes a handle—near the window to the imaging volume—for the window and closing the lid 176. Alternatively, the lid 176 can be opened and closed automatically by an actuator (e.g., a linear or rotary servo motor, a hydraulic linear actuator, etc.) controlled by the controller.

The soft good module 170 can include one or more stops configured to set an offset between the platen 172 and the lid 176 when the lid 176 is closed and latched, as described below. The stops can be adjustable (e.g., mounted on threaded studs) or replaceable (e.g., with stops of different heights) to accommodate soft goods of different thicknesses and/or to achieve different target compression levels for soft goods of one or more thicknesses when the lid 176 is closed and latched. The lid 176 can additionally or alternatively be of a mass sufficient to compress a soft good between the platen 172 and the lid 176 and to bottom on the stops once lowered. In another implementation, the soft good module 170 can omit stops, and the lid 176 can be weighted to achieve a target level of compression of a soft good placed on the platen 172 below. In this implementation, weight can be added and removed from the lid 176 to achieve the target level of compression of the soft good; for example, the lid 176 can include a receptacle for ferrous or magnetic inserts about its perimeter and configured to receive or retain weights of various masses sized for the type and/or thickness of the textile loaded into the soft good module 170. In other implementations, the soft good module 170 can include a tunable spring, a magnet, and/or an actuator, etc. configured to apply a consistent force onto the lid 176 to achieve consistent compression of a soft good between the lid 176 and the platen 172.

Alternatively, the lid 176 can be mounted to a four-bar linkage that maintains the lid 176 parallel to the platen 172 as the lid 176 is raised and lowered. The lid 176 can also be arranged on a slide or linear guide and can slide into position over the platen 172. However, the lid 176 can be coupled to and arranged over the platen 172 in any other way.

The lid 176 can further include a latch adjacent the window to the imaging volume and manually operable to engage (e.g., latch or lock into) a corresponding feature on the platen 172 (or elsewhere within the soft good module 170 to lock the lid 176 in the lowered position. For example, the latch can automatically lock the lid 176 in a lowered position when the lid 176 is manually closed by an operator and to unlock the lid 176 when actuated by the operator.

Alternatively, the latch can be automatically actuated, such as electronically by the controller. The latch can also include a switch or other sensor configured to detect when the lid 176 is closed, and the controller can automatically activate the diffuse lighting module 178 when the lid 176 is lowered and latched. The lid 176 can be similarly latched open, such as with a mechanical or magnetic latch.

The perimeter guide 174 can include an insert defining an internal perimeter approximating a slightly oversized perimeter of a textile panel or complete textile product to be loaded into the soft good module 170 for imaging. For example, the perimeter guide 174 can include a polycarbonate, nylon, plywood, or Masonite panel—of thickness less than the target compressed thickness of the soft good—cut with a laser cutter, cut with a waterjet, or milled according to conventional machining processes to form an internal cutout offset five millimeters from an approximate perimeter of the soft good once the soft good is flattened between the lid 176 and the platen 172, as shown in FIG. 5. In this example, the perimeter guide 174 can be loaded into the soft good module 170 to configure the soft good module 170 for imaging units of a soft good of a particular type and geometry, such as to prevent an operator from placing a unit of the soft good into the soft good module 170 upside down or wrinkled. The perimeter guide 174 can be located over the platen 172 by features within the soft good module 170, such as pins or tabs extending upwardly from the perimeter or corners of the platen 172. An operator can thus open the lid 176, place a unit of the textile across the platen 172 and within the bounds of the perimeter guide 174, and then close the lid 176 to trigger the controller to actuate the diffuse lighting module 178 and to trigger the sensor module to capture an image of the unit. Furthermore, the perimeter guide 174 can function as a stop, as described above, that contacts the bottom of the lid 176 when closed, thereby constraining the vertical position of the lid 176 in the closed position to achieve a target level of compression of a soft good between the lid 176 and the platen 172.

In this variation, because the lid 176 may be reflective, the system 100 can further include a first polarized light filter—oriented in a first direction—over a flash integrated into the optical sensor or into a separate bright-field lighting module. The system 100 can also include a second polarized light filter—oriented in a second direction perpendicular to the first direction—over the lens of the optical sensor. Thus, light output from the flash or bright-field lighting module can reach the lid 176 polarized in a first direction; a portion of this light, that is reflected off of the planar surface of interest on the lid 176 and back toward the optical sensor can remain polarized in this first direction and thus blocked from the optical sensor by the second polarized light filter oriented in a perpendicular orientation such that this reflected light does not appear as glare in an image recorded by the optical sensor. However, light passing through the lid 176 may reflect off of the soft good and other surfaces within the soft good module 170 before returning to the sensor module such that this light: is no longer parallel to the first polarized light filter; is passed by the second polarized light filter; and is recorded by the optical sensor as a low-glare image of the soft good unit.

In the foregoing variation, the sensor module can similarly include a single polarized light filter over the lens of the optical sensor in order to reduce glare. Alternatively, the sensor module can include a singular circular polarizer (or a set of polarizers of the same handedness) arranged across the optical sensor flash and the optical sensor lens to similarly reject light reflected from the lid 176 back toward the optical sensor. The lid 176 can additionally or alternatively include an anti-glare and/or low-reflectivity coating.

A garment or textile panel placed in the soft good module 170 can exhibit various visually-identifiable physical features—such as edges, seams, hems, button holes, and/or manufacturing defects—that, once recorded in an image of the soft good, can be identified manually or via computer vision techniques and transformed into approximate relative positions and dimensions of these features and of the soft good generally. For example, a button hole—in a garment placed within the soft good module 170—that has been opened or "splayed" and that is not obscured by a section of fabric below may be illuminated by the diffuse lighting module 178 and may present within an image—recorded by the optical sensor—as an encircled bright (or white) area. Upon receipt of this image, a remote computer system tasked with processing this image can implement template matching or other computer vision techniques to identify this encircled bright area and to label this bright area as an open button hole. For button holes that are obscured by fabric below or not splayed open when the soft good is placed in the soft good module 170, an operator can insert a button stud—such as a metallic stud defining a shoulder and/or optical fiducial at each end to retain the stud within a button hole—into the button hole before placing the soft good into the soft good module 170; once the optical sensor captures an image of the soft good, the remote computer system can implement similar computer vision techniques to identify the button stud in this image and to label a region of the image around the button stud as a button hole. The remote computer system can also implement computer vision techniques to identify a seam, hem, or edge of the soft good and to label these regions of the image accordingly. The remote computer system can then calculate a centroid or other reference point, line, or area on or within each identified feature in the image and can compare the relative positions of these reference points to extract various dimensions (e.g., within a resolution of 100 micrometers or one millimeter) of the soft good.

Furthermore, the lid 176 can include a checkerboard, fiducial, or other calibration feature patterned across its bottom surface (e.g., about the perimeter of its bottom surface or at each corner of the lid 176). When lowered over a soft good loaded onto the platen 172, the bottom surface of the lid 176 contacts and depresses the surface of interest on the soft good, and the soft good conforms to the planar bottom surface of the lid 176. The controller or remote computer system can therefore implement computer vision techniques to identify these calibration features—patterned across the bottom of the lid 176—in an image and can calibrate dimensions of features of the soft good—at the planar bottom surface of the lid 176—shown in the image according to these calibration features. Similarly, the lid 176 can include square gridlines patterned (e.g., laser-etched, engraved) across the width and breadth of its top or bottom surface at known offset distances (e.g., twenty millimeters), and the controller or remote computer system can estimate relative distances between features of a soft good based on their positions relative to these grid lines of known offset distance. Alternatively, the soft good module 170 can include calibration features patterned across the platen 172, the perimeter guide 174, or other surfaces therein; and the controller or remote computer system can implement any other methods or techniques to calibrate an image captured by the optical sensor according to these calibration features.

12. Mirrors

Figure 6:
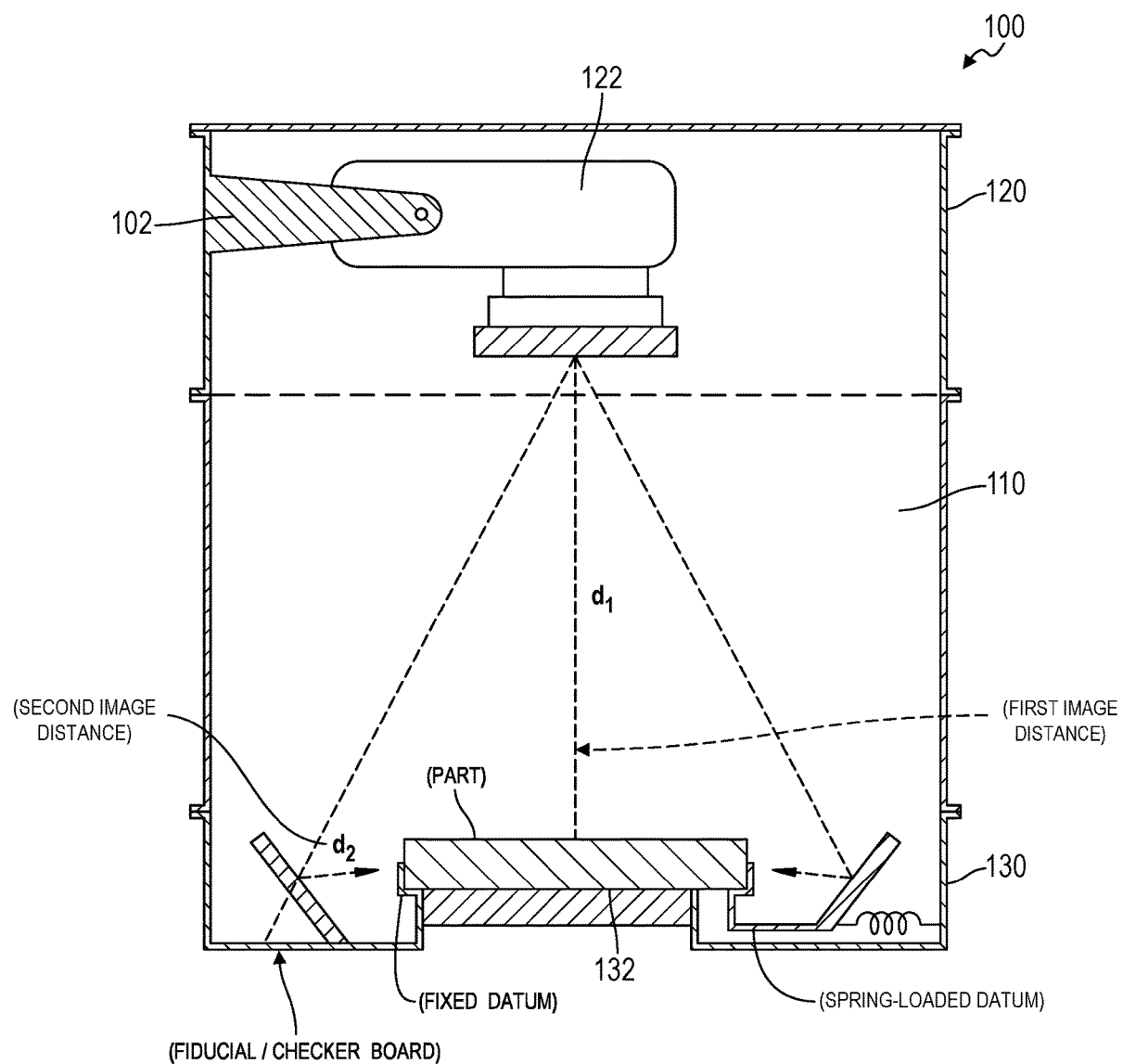
FIG. 6 is a schematic representation of one variation of the system.

As shown in FIG. 6, one variation of the nest module includes: a mirror 134 arranged to the side of the nest module—at an angle facing both the optical sensor above and one side of a part loaded into the nest module—and configured to reflect an image of an adjacent side of the part toward the optical sensor such that a single image recorded by the optical sensor contains optical data representing both the top of the part and the side of the part. Generally, in this variation, the nest module can include one or more mirrors arranged around the perimeter of the nest module, facing the nest module, and configured to reflect images of the side(s) of a part placed in the nest module toward the optical sensor overhead such that an image recorded by the optical sensor contains optical data representative of both the top of the part—immediately facing the optical sensor—and sides of the part—which may be perpendicular to the viewing axis of the optical sensor—via the mirror(s) 134. In particular, the optical sensor can record a single image of a part loaded into this variation of the nest module containing one or more mirrors, and the controller or other computer system can extract quantitative dimensional data and identify surface defects on the top and one or more sides of the part from this single image (or from a sequence of images recorded by the optical sensor before the part is removed from the nest module). For example, an optical inspection station can be outfitted with a mirror arranged on the nest module adjacent the receptacle, arranged within the field of view of the optical sensor, and positioned at an angle that reflects light from a vertical side of the first unit of the first part, perpendicular to the surface of interest, toward the optical sensor.

In this variation, the nest module can define a valley or recess around the periphery of the nest module such that, when a part is placed in the nest module, a field between each mirror and adjacent faces of the parts remains unobscured, as shown in FIG. 6. (Similarly, the nest module can include a pedestal or column that raises the nest module above the mirror(s) 134.) The nest module can also define a set of datum reference surfaces (or "datums") that extend upwardly from corners of the nest module to contact and constrain corners of a part loaded into the nest module, thereby locating the part relative to the optical sensor above while leaving a major region of each side of the part unobscured from the field of view of the optical sensor via an adjacent mirror.

In one implementation, each datum is fixed relative to the nest module. Alternatively, all or a subset of the datums can be spring loaded. In one example shown in FIG. 6, the nest module can define a rectangular nest and can include: a first pair of fixed post datums spanning an upper horizontal edge of the nest module; a second pair of fixed post datums spanning a left vertical edge of the nest module; a third pair of spring-loaded post datums spanning a lower horizontal edge of the nest module; and a fourth pair of spring-loaded post datums spanning a right vertical edge of the nest module. An operator can manually retract the third and fourth datum post pairs or depress a part between the fixed and spring-loaded datum post pairs when inserting a part into the nest module, and the third and fourth datum post pairs can adjust to constrain a part against the first and second fixed post pairs without slop. In this implementation, the nest module can also include: a first fixed mirror facing a first side of the nest module between the first pair of datum posts; a second fixed mirror facing a second side of the nest module between the second pair of datum posts; a third mirror facing a third side of the nest module and coupled to the third pair of datum posts; and a fourth mirror facing a fourth side of the nest module and coupled to the fourth pair of datum posts. The third and fourth mirrors can thus move with the third and fourth datum post pairs respectively, in order to preserve a distance between the third mirror and the third face of a part placed in the nest module and in order to preserve a distance between the fourth mirror and the fourth face of the part placed in the nest module despite the absolute of the part. In particular, the nest module can include fixed mirrors between one or more fixed datums and mirrors coupled to one or more spring-loaded datums in order to constrain a part within the nest module with its sides at constant, known distances to each adjacent mirror despite the absolute size and geometry of the part.

Alternatively, this variation of the nest module can include transparent datums, such as acrylic or polycarbonate datums configured to contact and locate a part within the nest module, and the optical sensor can record optical data of the sides of the part through these transparent datums. However, the nest module can include any other number of (e.g., three or more) datums configured to make area, line, or point contact with the bottom and sides of a part in order to kinematically locate or to over-constrain the part within the nest module.

The nest module can therefore include one or more mirrors. Each mirror can include a planar mirror with a reflective outer-surface coating. Each mirror can be mounted to an adjustable stand and can be rotated about one or more axes (e.g., "tuned") to achieve an orthonormal view of an adjacent side of the part when viewed from the optical sensor lens above. For example, a movable datum can be coupled to an adjacent mirror (e.g. by a mechanical cam) to shift the mirror 134 to an angle that achieves an orthonormal view of an adjacent side of a part as the datum is moved to accommodate the part, as described above. In another example, each mirror can be coupled to a piezoelectric actuator or to a servo controlled by the controller to achieve an orthonormal view of the adjacent side of the part regardless of the size and position of the part.

The nest module can additionally or alternatively include one or more mirrors defining concave (or convex) reflective surfaces that reflect enlarged (or fisheye) images toward the optical sensor, thereby enabling the optical sensor to record higher-resolution optical data of the sides of the part than of the top of the part in a single image. Similarly, the nest module can include a lens arranged between a mirror and an adjacent side of the nest module (or between the mirror 134 and camera lens) that similarly magnifies an image of the side of a part, which the mirror 134 then reflects toward the optical sensor.

In this variation, a first imaging distance from the optical sensor to the surface of interest on a part loaded into the nest module can be less than a second imaging distance from the optical sensor to a mirror facing a side of the part, as shown in FIG. 6. To image a part loaded into the nest module in a single orientation, the optical sensor can focus to the first imaging distance, capture a first image with the top of the part in focus, focus to the second imaging distance, and capture a second image with one or more sides of the part in focus. Alternatively, the optical sensor can focus to a composite imaging distance between (e.g., the average of) the first and second imaging distances and can capture a single image containing optical data of both the top and sides of the part—approximately in focus—during a single imaging sequence.

In this variation, the nest module can also include calibration features that the controller or remote computer system can detect and process in images captured by the optical sensor above to calibrate one or more warped coordinate systems for transforming regions of an image of a part—loaded into the nest module—into real quantitative dimensions. In one implementation, for each mirror, the nest module includes a checkerboard pattern or other reference fiducial arranged behind the mirror 134 at the plane of a virtual image reflected toward the optical sensor by the mirror 134 and representing the adjacent side of a part loaded into the nest module. For example, an operator can remove each mirror from the nest module, place a checkerboard insert adjacent each mirror position around the nest module, and trigger the optical sensor to record a calibration image; the controller or remote computer system can then process the calibration image to generate or calibrate a warped coordinate system for the top of the part and for each side of the part facing a mirror in the current configuration of the system 100. Alternatively, the nest module can include one or more checkerboard patterns or other reference fiducials intransiently installed around the nest module. For example, the system 100 can be calibrated with calibration plates—placed on or around the nest module—specific to each imaging distance (described above). Similarly, the system 100 can be calibrated from images recorded by the optical sensor while a calibration structure (e.g., a six-sided cube) containing checkerboard patterns across its faces(s) is placed on the nest module.

In this variation, the controller or a remote computer system can also generate multiple discrete warped coordinate systems, map a warped coordinate system to each discrete region of an image representing a side of a part, and extract quantitative (e.g., dimensional) data from each of these regions according to warped coordinate systems mapped to each of these discrete regions of the image. In one example, a rectilinear part is loaded into a rectangular nest surrounded by four mirrors configured to project images of the four sides of the part toward the optical sensor. In this example, an image of the part—recorded by the optical sensor—can contain: a first region representing the top of the part; and a second region—adjacent the first region—representing a first side of the part. In one implementation in which the part is rectangular in cross-section and the nest module includes one mirror facing each of the four sides of the part, the image can also contain: a third region representing a second side of the part; a fourth region representing a third side of the part; and a fifth region representing a fourth side of the part. The controller (or the remote computer system) can implement computer vision techniques, such as edge detection, and/or a map of known mirror and nest positions within the nest module to identify each of the first, second, and other discrete regions in the image. The controller can merge calibration data for each mirror—such as extracted from an image recorded previously when the mirrors 134 were removed to reveal checkerboard inserts at the virtual image plane of each mirror, as described above—with the focal length, aperture, and other imaging parameters executed by the optical sensor when the image was recorded to generate one warped coordinate system per discrete region in the image. By then mapping each warped coordinate system to its corresponding region in the image, the controller or remote computer system can extract dimensions, relative positions, and other quantitative data for the top and sides of the part from each corresponding region of the image based on positions of features within these discrete regions relative to these warped coordinate systems.

The controller or remote computer system can also segment (or "break") the image into multiple discrete sub-images, each sub-image corresponding to one of the "top", "left", "right", etc. of the imaged part. The controller or remote computer system can then implement the foregoing methods and techniques to apply a unique warped coordinate system to each discrete sub-image.

In the foregoing implementation, the controller or remote computer system can also correct warped coordinate system corresponding to regions of an image representing the sides of the part (i.e., the second, third, fourth, and fifth regions of the image) based on data extracted from the first region of the image representing the top of the part. For example, the controller can: implement edge detection techniques to identify the perimeter of the part in the image; calculate actual unique distances between the optical sensor and the image planes for each of the second, third, fourth, and fifth regions of the image based on known positions of the mirrors 134 within the nest module and the actual position of the perimeter of the part on the nest module; and correct each warped coordinate system based on these actual image plane distances.

13. Image Analysis

In one variation shown in FIG. 8, the system 100 offloads images to a remote computer system for analysis, such as in a batch or in real-time as these images are recorded. The remote computer system can then: detect a surface defect on a surface of interest on a unit of a part based on an aberration in light intensity within a region of a dark-field image corresponding to the surface of interest; and extracting a real dimension of a feature on the unit from a bright-field image of the unit.

13.1 Data Offloading

In one variation, the system 100 further includes a communication module 182 configured to offload images to a remote computer system. For example, the communication module 182 can offload images to the remote computer system via a wireless or wired connection, such as to a remote computer system local to the assembly line (e.g., a local desktop or laptop computer) or to a remote server via the Internet or other computer network.

The communication module 182 can offload images to the remote computer system in (near) real-time as these images are recorded by the optical sensor. Alternatively, the controller can assemble all bright-field, dark-field, and/or side lighting images (and weight data, as described above) of one unit into an image packet, and the communication module 182 can then offload each image packet to the remote computer system once assembled by the controller. Yet alternatively, the communication module 182 can offload images to the remote computer system intermittently, such as once per hour or one per day. However, the communication module 182 can offload image data to the remote computer system in any other way and according to any other schedule.

13.2 Image Processing

Upon receipt of these images from the optical inspection station, the remote computer system can process these images to extract qualitative and/or quantitative data—related to the production of units on the production line—from these images. In one implementation, a software program 190 executing on the remote computer system: implements machine vision techniques to identify optical fiducials shown in an image; generates a warped coordinate system based on these fiducials, the focal length of the optical sensor lens, and/or other station or camera parameters, etc.; maps the warped coordinate system to the bright-field image; implements machine vision (e.g., edge detection) techniques to detect edges in the bright-field image;

projects these detected edges onto the warped coordinate system to extract dimensions of features in the unit; and stores these dimensions in a database and/or serves these dimensions to an operator or engineer in Block S150. Because the optical sensor records the bright-field and dark-field images at the same imaging parameters (e.g., focal length) and in rapid sequence without repositioning of the part, the controller (or remote computer system) can then: map the perimeter of the part identified in the bright-field image to the dark-field image; calculate an average or medium light intensity within the region of the dark-field image corresponding to the surface of interest of the unit; detect specific areas within this region that fall outside of this average or median intensity by more than a threshold intensity; project the warped coordinate system onto the dark-field image to calculate real locations, geometries, and/or sizes of these anomalous regions as possible surface defects; and store these surface anomaly data in a database and/or serve these surface anomaly data to an operator or engineer in Block S140.

In a similar implementation, the remote computer system can implement computer vision techniques and methods described in U.S. patent application Ser. No. 15/407,158 to: dewarp a bright-field image, such as based on calibration images—of a checkerboard, fiducial, or other calibration feature placed on the nest module—recorded by the optical sensor during a setup routine; detect features in the dewarped bright-field image; extract these features from the dewarped bright-field image; identify a region of the bright-field image representing the unit; extract a subset of features inside this region of the bright-field image; convert dimensions of this subset of features in pixel space to dimensions in real space based on a known pixel-to-real-space conversion ratio extracted from the calibration image; and store these dimensions in a file or other database associated with the unit in Block S150. The remote computer system can also: access the dark-field image of the unit; dewarp the dark-field image, as described above; project the perimeter of the region representing the unit in the bright-field image onto the dark-field image or otherwise detect a region representing the unit in the dark-field image; calculate a light intensity (or brightness, color) gradient within this region of the image; detect areas in the light intensity gradient exhibiting steep changes in light intensity; discard areas of steep change in light intensity aligned with edge and corner features detected in the bright-field image; and flag remaining areas of steep change in light intensity as possibly representing surface defects in Block S140.

In this implementation, the remote computer system can also selectively scan surfaces represented in the dark-field image for such surface defects, such as bearing surfaces and exterior surfaces for which such surface defects may affect function and appearance, respectively. The remote computer system can implement similar methods and techniques to process a side lighting image of the unit to detect surface defects on the unit and can compile surface defects detected in the dark-field and side lighting images into the file or other database associated with the unit. The remote computer system can also extract real dimensions of features in the unit from the side lighting image according to methods and techniques described above and write these real dimensions to the file or other database associated with the unit.

However, the remote computer system or software program 190 can implement any other method or technique to extract real dimensions and detect surface defects in images of a unit of a part. Alternatively, the controller can implement these methods and techniques to process images of units of parts locally on the optical inspection station.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software components of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for recording images of parts for optical inspection comprising:
   an enclosure defining an imaging volume;
   an optical sensor defining a field of view directed toward the imaging volume and an image plane across the imaging volume;
   a receptacle opposite the optical sensor and configured to locate a surface of interest on a unit of a part at the image plane;
   a dark-field lighting module configured to output light substantially parallel to the image plane;
   a bright-field lighting module configured to output light toward the image plane; and
   a controller configured to:
      activate the dark-field lighting module and trigger the optical sensor to record a first image of the unit of the part;
      activate the bright-field lighting module and trigger the optical sensor to record a second image of the unit of the part;
      detect a first surface defect on the surface of interest on the unit of the part in the first image; and
      extract a first real dimension of a first feature on the unit of the part from the second image.

2. The system of claim 1:
   further comprising a side lighting module arranged between the dark-field lighting module and the bright-field lighting module; and
   wherein the controller is further configured to activate the side lighting module and trigger the optical sensor to record a third image of the unit of the part.

3. The system of claim 2, further comprising a remote computer system configured to detect a second surface defect on the surface of interest on the unit of the part based on an aberration in light intensity within a region of the third image corresponding to the surface of interest.

4. The system of claim 1:
wherein the dark-field lighting module is further configured to output light substantially parallel the surface of interest on the unit of the part when the unit of the part is located by the receptacle; and
wherein the bright-field lighting module is further configured to output light toward the surface of interest on the unit of the part when the unit of the part is located by the receptacle.

5. The system of claim 1:
wherein the enclosure locates the optical sensor over a conveyor; and
wherein the receptacle is located on the conveyor.

6. A system for recording images of parts for optical inspection comprising:
a first enclosure defining a first imaging volume;
a first optical sensor defining a first field of view directed toward the first imaging volume and a first image plane across the first imaging volume;
a dark-field lighting module configured to output light substantially parallel to the first image plane;
a first controller configured to:
at a first time, activate the dark-field light module and trigger the first optical sensor to record a first image of a unit of a part located within the first imaging volume, the unit of the part defining a surface of interest at the first image plane; and
offload the first image to a remote computer system;
a second enclosure defining a second imaging volume;
a second optical sensor defining a first field of view directed toward the second imaging volume and a second image plane across the second imaging volume;
a bright-field lighting module configured to output light toward the second image plane;
a second controller configured to:
at a second time, activate the bright-field light module and trigger the second optical sensor to record a second image of the unit of the part located within the second imaging volume, the surface of interest of the unit of the part located at the second image plane; and
offload the second image to the remote computer system; and
a remote computer controller configured to:
access the first image and the second image;
detect a surface defect on the surface of interest on the unit of the part in the first image; and
extract a real dimension of a feature on the unit of the part from the second image.

7. The system of claim 6:
wherein the first enclosure locates the first optical sensor over a conveyor; and
wherein the second enclosure locates the second optical sensor over a conveyor.

8. A method for recording images of parts for optical inspection comprising:
at an optical inspection station interposed between assembly stations within an assembly line and comprising a first lighting element:
detecting a unit of a part within the optical inspection station;
in response to detecting the unit of the part at an initial time:
deactivating the first lighting element;
recording a baseline image of the unit of the part in an ambient lighting condition;
estimating an ambient light level based on the baseline image;
setting a light intensity based on the ambient light level; and
at a first time succeeding the initial time:
activating the first lighting element according to the light intensity; and
capturing a first image of the unit of the part according to a first exposure time based on the light intensity.

9. The method of claim 8, wherein detecting the unit of the part within the optical inspection station comprises detecting the unit of the part on a receptacle within the optical inspection station.

10. The method of claim 8, wherein detecting the unit of the part within the optical inspection station comprises detecting the unit of the part on a conveyor through the optical inspection station, the conveyor translating units of the part along the assembly line.

11. The method of claim 8, wherein detecting the unit of the part within the optical inspection station comprises detecting the unit of the part within the optical inspection station based on an output of a weight sensor arranged within the optical inspection station.

12. The method of claim 8:
wherein the first lighting element of the optical inspection station comprises a dark-field lighting element configured to output light substantially parallel to a surface of interest on the unit of the part when the unit of the part is located within the optical inspection station;
wherein setting the light intensity based on the ambient light level comprises setting a dark-field light intensity based on the ambient light level;
wherein activating the first lighting element according to the light intensity comprises activating the first lighting element according to the dark-field light intensity; and
wherein capturing the first image of the unit of the part according to the first exposure time based on the light intensity comprises capturing the first image of the unit of the part according to the first exposure time based on the dark-field light intensity.

13. The method of claim 12:
wherein the optical inspection station comprises a second lighting element comprising a bright-field lighting element configured to output light toward the surface of interest on the unit of the part when the unit of the part is located within the optical inspection station; and
further comprising:
in response to detecting the unit of the part at the initial time:
deactivating the second lighting element; and
setting a bright-field light intensity based on the ambient light level;
at a second time succeeding the initial time:
deactivating the first lighting element;
activating the second lighting element according to the bright-field light intensity; and
capturing a second image of the unit of the part according to a second exposure time based on the bright-field light intensity.

14. The method of claim 13, further comprising:
accessing the first image and the second image;
detecting a surface defect on the surface of interest on the unit of the part in the first image; and
extracting a real dimension of a feature on the unit of the part from the second image.

15. The method of claim 8:
wherein the first lighting element of the optical inspection station comprises a bright-field lighting element configured to output light toward a surface of interest of the unit of the part when the unit of the part is located within the optical inspection station;
wherein setting the light intensity based on the ambient light level comprises setting a bright-field light intensity based on the ambient light level;
wherein activating the first lighting element according to the light intensity comprises activating the first lighting element according to the bright-field light intensity; and
wherein capturing the first image of the unit of the part according to the first exposure time based on the light intensity comprises capturing the first image of the unit of the part according to the first exposure time based on the dark-field light intensity.

16. The system of claim 1, further comprising a remote computer system configured to:
access the first image and the second image;
detect a second surface defect on the surface of interest on the unit of the part in the first image; and
extract a second real dimension of a second feature on the unit of the part from the second image.

17. A system for recording images of parts for optical inspection comprising:
an enclosure defining an imaging volume;
an optical sensor defining a field of view directed toward the imaging volume and an image plane across the imaging volume;
a receptacle opposite the optical sensor and configured to locate a surface of interest on a unit of a part at the image plane;
a dark-field lighting module configured to output light substantially parallel to the image plane;
a bright-field lighting module configured to output light toward the image plane;
a controller configured to:
activate the dark-field lighting module and trigger the optical sensor to record a first image of the unit of the part; and
activate the bright-field lighting module and trigger the optical sensor to record a second image of the unit of the part; and
a remote computer system configured to:
access the first image and the second image;
detect a surface defect on the surface of interest on the unit of the part in the first image; and
extract a real dimension of a feature on the unit of the part from the second image.

18. A system for recording images of parts for optical inspection comprising:
an enclosure defining an imaging volume;
an optical sensor defining a field of view directed toward the imaging volume and an image plane across the imaging volume;
a receptacle opposite the optical sensor and configured to locate a surface of interest on a unit of a part at the image plane;
a dark-field lighting module configured to output light substantially parallel to the image plane;
a bright-field lighting module configured to output light toward the image plane;
a controller configured to:
activate the dark-field lighting module and trigger the optical sensor to record a first image of the unit of the part; and
activate the bright-field lighting module and trigger the optical sensor to record a second image of the unit of the part; and
a software program executing on a remote computer system and configured to:
access the first image and the second image;
detect a surface defect on the surface of interest on the unit of the part in the first image; and
extract a real dimension of a feature on the unit of the part from the second image.

19. A system for recording images of parts for optical inspection comprising:
an enclosure defining an imaging volume;
an optical sensor defining a field of view directed toward the imaging volume and an image plane across the imaging volume;
a receptacle opposite the optical sensor and configured to locate a surface of interest on a unit of a part at the image plane;
a dark-field lighting module configured to output light substantially parallel to the image plane;
a bright-field lighting module configured to output light toward the image plane;
a side lighting module arranged between the dark-field lighting module and the bright-field lighting module;
a controller configured to:
activate the dark-field lighting module and trigger the optical sensor to record a first image of the unit of the part;
activate the bright-field lighting module and trigger the optical sensor to record a second image of the unit of the part; and
activate the side lighting module and trigger the optical sensor to record a third image of the unit of the part; and
a remote computer system configured to detect a surface defect on the surface of interest on the unit of the part based on an aberration in light intensity within a region of the third image corresponding to the surface of interest.

20. A system for recording images of parts for optical inspection comprising:
a first enclosure defining a first imaging volume;
a first optical sensor defining a first field of view directed toward the first imaging volume and a first image plane across the first imaging volume;
a dark-field lighting module configured to output light substantially parallel to the first image plane;
a first controller configured to:
at a first time, activate the dark-field light module and trigger the first optical sensor to record a first image of a unit of a part located within the first imaging volume, the unit of the part defining a surface of interest at the first image plane; and
offload the first image to a remote computer system;
a second enclosure defining a second imaging volume;
a second optical sensor defining a first field of view directed toward the second imaging volume and a second image plane across the second imaging volume;
a bright-field lighting module configured to output light toward the second image plane;
a second controller configured to:
at a second time, activate the bright-field light module and trigger the second optical sensor to record a second image of the unit of the part located within the second imaging volume, the surface of interest of the unit of the part located at the second image plane; and offload the second image to the remote computer system; and a software program executing on the remote computer system configured to:

access the first image and the second image;

detect a surface defect on the surface of interest on the unit of the part in the first image; and extract a real dimension of a feature on the unit of the part from the second image.

* * * * *